(12) United States Patent
Chainer et al.

(10) Patent No.: US 11,068,628 B2
(45) Date of Patent: **\*Jul. 20, 2021**

(54) HYBRID MODELING FOR A DEVICE UNDER TEST ASSOCIATED WITH A TWO-PHASE COOLING SYSTEM

(71) Applicant: International Business Machines Corporation, Armonk, NY (US)

(72) Inventors: Timothy Joseph Chainer, Putnam Valley, NY (US); Pritish Ranjan Parida, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/556,764

(22) Filed: Aug. 30, 2019

(65) Prior Publication Data

US 2019/0392096 A1 Dec. 26, 2019

Related U.S. Application Data

(63) Continuation of application No. 15/196,713, filed on Jun. 29, 2016, now Pat. No. 10,423,735.

(51) Int. Cl.
*G06G 7/50* (2006.01)
*G06F 30/20* (2020.01)
(Continued)

(52) U.S. Cl.
CPC .............. *G06F 30/20* (2020.01); *F24F 11/30* (2018.01); *F24F 11/52* (2018.01);
(Continued)

(58) Field of Classification Search
CPC ........... F24F 2001/0074; F24F 2140/12; F28F 27/00; F28F 2200/00; F28F 19/00; F28F 2250/108
See application file for complete search history.

(56) References Cited

U.S. PATENT DOCUMENTS

| 5,050,114 A | 9/1991 | Lee |
| 7,181,374 B1 | 2/2007 | Mosterman et al. |

(Continued)

OTHER PUBLICATIONS

Xie et al. 3D Transient Thermal Solver Using Non-conformal Domain Decomposition Approach ICCAD 2012, Nov. 2012 (Year: 2012).*

(Continued)

*Primary Examiner* — Rehana Perveen
*Assistant Examiner* — Cuong V Luu
(74) *Attorney, Agent, or Firm* — Amin, Turocy & Watson, LLP

(57) ABSTRACT

Techniques that facilitate hybrid modeling for a device under test associated with a cooling system (e.g., a two-phase cooling system) are provided. In one example, information indicative of a first model of a device under test associated with a cooling system is determined. Second information indicative of constraints that define values for an operational quantity related to the cooling system is also determined. Information indicative of a second model for the device under test is generated based on the information indicative of the first model and the second information indicative of the one or more constraints. In an aspect, a first simulation process is performed to determine first thermal properties for a first simulation domain associated with the device under test. In another aspect, a second simulation process is performed to determine second thermal properties for a second simulation domain associated with the device under test.

20 Claims, 16 Drawing Sheets

(51) Int. Cl.
*F24F 11/30* (2018.01)
*F24F 11/52* (2018.01)
*G06F 113/18* (2020.01)
*G06F 119/06* (2020.01)
*G06F 119/08* (2020.01)

(52) U.S. Cl.
CPC ...... *G06F 2113/18* (2020.01); *G06F 2119/06* (2020.01); *G06F 2119/08* (2020.01)

(56) References Cited

U.S. PATENT DOCUMENTS

| | | |
|---|---|---|
| 8,539,408 B1 | 9/2013 | Cheng et al. |
| 8,630,830 B1 | 1/2014 | DiStefano, III et al. |
| 9,852,481 B1 | 12/2017 | Turney et al. |
| 2004/0065097 A1 | 4/2004 | Bash et al. |
| 2006/0162365 A1 | 7/2006 | Hoang et al. |
| 2008/0123297 A1 | 5/2008 | Tilton et al. |
| 2008/0221845 A1 | 9/2008 | Yu et al. |
| 2009/0126902 A1 | 5/2009 | Choe et al. |
| 2010/0204963 A1 | 8/2010 | Shapiro |
| 2013/0317785 A1 | 11/2013 | Chainer et al. |
| 2015/0025854 A1 | 1/2015 | Martinez Canedo et al. |
| 2016/0124443 A1 | 5/2016 | Reda et al. |
| 2016/0179992 A1 | 6/2016 | Van Der Velden |
| 2017/0249403 A1 | 8/2017 | Tate, Jr. |
| 2018/0113963 A1 | 4/2018 | Kordon et al. |

OTHER PUBLICATIONS

Qu et al. A Systematic Methodology for Optimal Design of Two-Phase Micro-Channel Heatsinks Journal of Electronic Packaging, vol. 127, Dec. 2005 (Year: 2005).*

Wang et al. Effects Of Inlet/Outlet Configurations On Flow Boiling Instability In Parallel Microchannels International Journal of Heat and Mass Transfer 51,2008 pp. 2267-2281 (Year: 2008).*

Non-Final Office Action received for U.S. Appl. No. 15/196,713 dated Jan. 18, 2019, 55 pages.

Xie et al., "3D Transient Thermal Solver Using Non-conformal Domain Decomposition Approach", ICCAD 2012, pp. 333-340.

Qu et al., "A Systematic Methodology for Optimal Design of Two-Phase Micro-Channel Heat Sinks", Journal of Electronic Packaging, vol. 127, Dec. 2005, pp. 381-390.

Wang et al., "Effects of Inlet/Outlet Configurations on Flow Boiling Instability in Parallel Microchannels", International Journal of Heat and Mass Transfer, vol. 51, 2008, pp. 2267-2281.

Lee et al., "Neuro-Genetic Optimization of Micro Compact Heat Exchanger", International Journal of Numerical Methods for Heat & Fluid Flow, vol. 17, No. 1, 2007, pp. 20-33.

Saenen et al., "Numerical Model of a Two-Phase Microchannel Heat Sink Electronics Cooling System", International Journal of Thermal Sciences, vol. 59, 2012, pp. 214-223.

Notice of Allowance received for U.S. Appl. No. 15/196,713 dated May 15, 2019, 33 pages.

Gödecke et al., "FEM Models in System Simulations Using Model Order Reduction and Functional Mockup Interface", Proceeding of the 9th International Modelica Conference, Sep. 2012, pp. 565-570.

Parida et al., "Eulerian Multiphase Conjugate Model for Chip-Embedded Micro-Channel Flow Boiling", Proceeding of Asme InterPACK/ICNMM, Jul. 6-9, 2015, 11 pages.

Parida, Pritish R., "Reduce Order Modeling for Chip-Embedded Micro-Channel Flow Boiling", Proceeding of ASME InterPACK/ICNMM, Jul. 6-9, 2015, 10 pages.

Sridhar et al., "STEAM: A fast compact thermal model for two-phase cooling of integrated circuits", Computer-Aided Design (ICCAD), IEEE/ACM International Conference, Nov. 2013, pp. 256-263.

Adham et al., "Thermal and hydrodynamic analysis of microchannel heat sinks: A review", Renewable and Sustainable Energy Reviews, vol. 21, 2013, pp. 614-622.

Barrau et al., "Effect of a hybrid jet impingement/micro-channel cooling device on the performance of densely packed PV cells under high concentration", Solar Energy, 2011, 11 pages.

Krishnan et al., "A novel hybrid heat sink using phase change materials for transient thermal management of electronics", IEEE Transactions on Components and Packaging Technologies, vol. 28, No. 2, May 23, 2005, 2 pages.

Sung et al., "Single-phase and two-phase cooling using hybrid micro-channel/slot-jet module", International Journal of Heat and Mass Transfer, vol. 51, 2008, pp. 3825-3839.

Sridhar et al., "Study of Two-phase Pressure Drop and Heat Transfer in a Micro-scale Pin Fin Cavity: Part A", 15th IEEE ITHERM Conference, 2016, 8 pages.

* cited by examiner

HYBRID MODELING FOR A DEVICE UNDER TEST ASSOCIATED WITH A TWO-PHASE COOLING SYSTEM

STATEMENT REGARDING FEDERALLY SPONSORED RESEARCH OR DEVELOPMENT

This invention was made with Government support under Contract Nos.: HR0011-13-C-0035 and FA8650-14-C-7466 awarded by Defense Advanced Research Projects Agency (DARPA). The Government has certain rights to this invention.

BACKGROUND

The subject disclosure relates to liquid cooling systems, and more specifically, to two-phase liquid cooling for electronics.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate hybrid modeling for a device under test associated with a two-phase cooling system are described.

According to an embodiment, a system can comprise a memory that stores computer executable components and a processor that executes computer executable components stored in the memory. The computer executable components can comprise a device model component that determines first information indicative of a first model of a device under test that receives a coolant fluid. The computer executable components can also comprise a system component that determines second information indicative of one or more constraints that defines a first value and a second value for an operational quantity related to a cooling system associated with the device under test. The computer executable components can also comprise a hybrid model component that generates third information indicative of a second model for the device under test based on the first information indicative of the first model and the second information indicative of the one or more constraints. The hybrid model component can perform a first simulation process to determine first thermal properties for a first simulation domain associated with the device under test. Furthermore, the hybrid model component can perform a second simulation process to determine second thermal properties for a second simulation domain associated with the device under test. The second simulation process can comprise a lower number of computational steps than steps associated with the first simulation process. The hybrid model component can also perform the first simulation process based on data generated by the second simulation process.

According to another embodiment, a computer-implemented method is provided. The computer-implemented method can comprise generating, by a system operatively coupled to a processor, first information indicative of a detailed model for a first portion of a device under test based on a three-dimensional model of the first portion of the device under test, the first information indicative of the detailed model comprising mass flow rate data indicative of a mass flow rate of liquid coolant associated with the first portion of the device under test. The computer-implemented method can also comprise generating, by the system, second information indicative of a reduced-order model for a second portion of the device under test based on the mass flow rate data. Also, the computer-implemented method can comprise generating, by the system, third information indicative of a hybrid model for two-phase flow in the first portion of the device under test and the second portion of the device under test based on the detailed model and the reduced-order model.

According to yet another embodiment, a computer program product for simulating two-phase flow in a device under test can comprise a computer readable storage medium having program instructions embodied therewith. The program instructions can be executable by a processor and cause the processor to receive device data indicative of information for the device under test associated with a two-phase liquid cooling system. The program instructions can also cause the processor to perform a detailed simulation process based on the device data and a three-dimensional model of the device under test to determine first thermal properties for a first portion of the device under test. The program instructions can also cause the processor to perform a reduced-order simulation process based on the detailed simulation process to determine second thermal properties for a second portion of the device under test.

DETAILED DESCRIPTION

Figure 1:
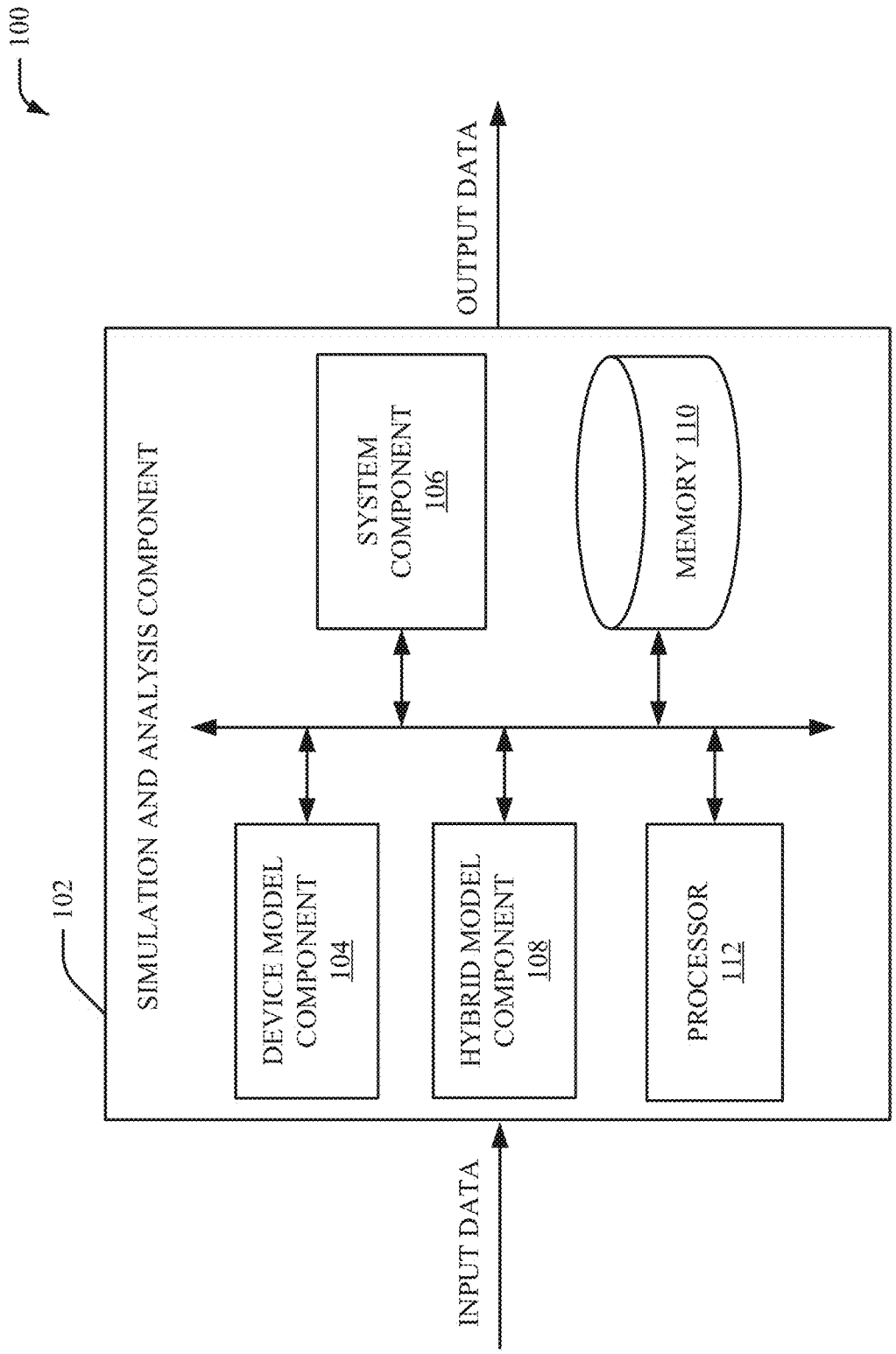
FIG. 1 illustrates a block diagram of an example, non-limiting simulation and analysis component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

For complex electronic chip architectures such as a three dimensional (3D) stacked electronic chip, a liquid cooling system can be employed in which liquid coolant (e.g., coolant fluid) is passed between layers of the 3D stacked electronic chip. One type of liquid cooling system is two-phase liquid cooling. Two-phase liquid cooling includes a pumped two-phase cooling loop in which liquid coolant (e.g., coolant fluid) can enter an electronic device package (e.g., a 3D stacked electronic chip) as single phase liquid. The liquid coolant can undergo boiling as the liquid coolant flows through cooling structures within the electronic device package and exit the electronic device package as a liquid-vapor mixture (e.g., a two-phase mixture). The liquid-vapor mixture (e.g., two-phase flow of gas and liquid) can be stored in a reservoir and/or can be further employed by the pumped two-phase cooling loop to cool the electronic device package. However, a two-phase liquid cooling system is generally complex. Furthermore, two-phase flow in an electronic device package associated with a two-phase liquid cooling system is generally computationally intensive to model. As such, optimization of a two-phase liquid cooling system and/or an electronic device package associated with a two-phase liquid cooling system is difficult. Moreover, large scale use of two-phase liquid cooling systems is limited due to the lack of thermal modeling tools that can accurately predict temperatures and/or two-phase flow in an electronic device package associated with a two-phase liquid cooling system.

Embodiments described herein include systems, computer-implemented methods, apparatus and computer program products that facilitate two-phase flow simulation and/or cooling design analysis for a two-phase liquid cooling system. For example, a hybrid modeling technique for an electronic device package associated with a two-phase liquid cooling system can be employed to facilitate two-phase flow simulation and/or cooling design analysis for the electronic device package. The hybrid modeling technique can perform detailed simulations (e.g., full-physics simulations) for a subset of simulation domains for the electronic device package. The detailed simulations can be performed based on a three dimensional (3D) model of the electronic device package. As used herein, a "detailed" simulation and a "full-physics" simulation can be a simulation of two-phase flow in an electronic device package in which a fluid domain portion of the electronic device package (e.g., a portion of the electronic device that is associated with flow of liquid coolant) and a solid domain portion of the electronic device (e.g., a portion of the electronic device that is associated with silicon or another semiconductor material) are modeled in 3D. The hybrid modeling technique can also perform reduced-order simulations (e.g., reduced-physics simulations) for other simulation domains for the electronic device package. The reduced-order simulations can be performed based on the detailed simulations and/or experimental data provided by one or more data sources. As used herein, a "reduced-order" simulation and a "reduced-physics" simulation can be a simulation of two-phase flow in an electronic device package in which a fluid domain portion of the electronic device package is modeled in one dimension (1D) or two dimensions (2D), and a solid domain portion of the electronic device is modeled in 1D, 2D or 3D. The detailed simulations can be performed for a first portion of the electronic device package and the reduced-order simulations can be performed for a second portion of the electronic device package that is different than the first portion of the electronic device package.

In an aspect, the detailed simulations can be performed for a solid domain portion of the electronic device package and/or an inlet manifold portion of the electronic device package. The solid domain portion of the electronic device can be associated with silicon material of the electronic device package. The inlet manifold portion of the electronic device can be associated with an inlet manifold of the electronic device package that receives liquid coolant from a two-phase liquid cooling loop. Additionally, the reduced-order simulations can be performed for a radial sector of the electronic device package. The radial sector of the electronic device package can be associated with a radial hierarchical channel structure of the electronic device package, in which the radial hierarchical channel structure includes a one or more channels for the liquid coolant received by the inlet manifold of the electronic device package. The detailed simulations and/or the reduced-order simulations can include thermal simulations and/or fluid flow simulations for the two-phase flow in the electronic device package. Furthermore, a model (e.g., a hybrid model) of two-phase flow in the electronic device package can be generated based on the detailed simulations and the reduced-order simulations. As such, accuracy of a model of two-phase flow in an electronic device package can be improved. Furthermore, an amount of time for simulating two-phase flow in the electronic device package and/or an amount of time for performing cooling design trade-off analysis for the electronic device package can be reduced. For example, one or more embodiments of the two-phase cooling system and/or design of the electronic device package described herein can be optimized efficiently (e.g., within a few hours). Moreover, an operating temperature of the electronic device package and/or an amount of power consumed by the electronic device package can be reduced.

FIG. 1 illustrates a block diagram of an example, non-limiting system that facilitates two-phase flow simulation and/or cooling design analysis for a two-phase liquid cooling system in accordance with one or more embodiments described herein. In various embodiments, the system 100 can be a two-phase flow simulation system and a cooling design analysis system. Moreover, the system 100 can be associated with, employed with or be included in a liquid cooling system (e.g., a two-phase liquid cooling system), a data center system, a electronic testing system and/or another type of system. The system 100 can employ hardware and/or software to solve problems that are highly technical in nature, that are not abstract and that cannot be performed as a set of mental acts by a human. Further, some of the processes performed may be performed by a specialized computer (e.g., a specialized computer with a simulation and analysis component) for carrying out defined tasks related to memory operations. The system 100 and/or components of the system can be employed to solve new problems that arise through advancements in technology, simulation of cooling systems and/or computer architecture, and the like. One or more embodiments of the system 100 can provide technical improvements to modeling systems, simulation systems and/or design systems by reducing an amount of time or reducing a number of processor steps for simulating two-phase flow in a device under test and/or by reducing an amount of time or reducing a number of processor steps for performing cooling design trade-off analysis for the device under test. In these regards, technical improvements are found in improved efficiency during simulation of two-phase flow and during cooling design trade-off analysis. One or more embodiments of the system 100 can also provide technical improvements to a device under test (e.g., a electronic device) by reducing or controlling an operating temperature of the device under test, by reducing or controlling an amount of power consumed by the device under test and/or by optimizing a cooling design structure for the design under test.

In the embodiment shown in FIG. 1, the system 100 can include a simulation and analysis component 102. As shown in FIG. 1, the simulation and analysis component 102 can include a device model component 104, a system component 106 and a hybrid model component 108. Aspects of the simulation and analysis component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the simulation and analysis component 102 can also include memory 110 that stores computer executable components and instructions. Furthermore, the simulation and analysis component 102 can include a processor 112 to facilitate execution of the instructions (e.g., computer executable components and corresponding instructions) by the simulation and analysis component 102. As shown, the device model component 104, hybrid model component 108, system component 106, processor 112 and/or memory 110 can be electrically and/or communicatively coupled to one another in one or more embodiments.

The device model component 104 can provide, determine and/or access information indicative of a device model of a device under test. The device under test can be any number of different types of electronic device packages. For example, in some embodiments, the device under test can be a 3D stacked electronic chip. In one example, the device under test can be a processor core (e.g., a complementary metal oxide semiconductor (CMOS) processor core). For example, the device under test can include a one or more channels that are etched into the device under test, and the one or more channels can receive a liquid coolant (e.g., coolant fluid). In some embodiments, the liquid coolant can be a liquid dielectric coolant. For example, the liquid coolant can be a coolant fluid such as water, a refrigerant or another type of liquid dielectric coolant.

In some embodiments, the device under test can also include an inlet manifold that receives the liquid coolant and supplies the liquid coolant to one or more channels. For example, the one or more channels can be coupled to the inlet manifold that is implemented as a central fluid distribution manifold for the one or more channels. In some embodiments, these channels can have a radial hierarchical channel structure. The radial hierarchical channel structure can be a solid portion of the device under test that includes one or more orifices, pin fins, nozzles, guiding structures, embedded cavities (e.g., micro-scale cavities) and/or outlets for the liquid coolant. Therefore, one or more paths for liquid coolant can be provided throughout one or more portions of the device under test.

The device may typically generate heat in response to being operated (e.g., being in a powered on state) and/or in response to processing data. The heat generated by the device under test can be generated as a function of properties for the device under test. Accordingly, the device model can include or take into account one or more of the properties for the device under test. The properties included in the device model can include, for example, power dissipation properties for the device under test, geometric dimensions for the device under test, structural properties for the device under test, electrical properties for the device under test or the like.

In an aspect, the liquid coolant can be provided to the device under test via a two-phase liquid cooling system. The two-phase liquid cooling system can be, for example, a pumped two-phase cooling loop that provides liquid coolant to the device under test. The liquid coolant can be employed by the device under test to reduce a temperature of the device under test and/or to offset the heat generated by the device under test in various embodiments. The liquid coolant provided to the device under test can be transformed into a liquid-vapor mixture (e.g., a two-phase mixture) as the liquid coolant flows through the one or more channels etched into the device under test.

In some embodiments, the system component 106 can provide information related to one or more operational quantities associated with the two-phase liquid cooling system and/or the device under test. For example, the one or more operational quantities can include, but are not limited to, specification information (e.g., density of a liquid phase, density of a vapor phase, heat capacity of a liquid phase, heat capacity of a vapor phase, thermal conductivity of a liquid phase, thermal conductivity of a vapor phase, chemical potential of a liquid phase, chemical potential of a vapor phase, etc.) for the liquid coolant, threshold values (e.g., pressure threshold values, temperature threshold values, etc.) for the two-phase liquid cooling system and/or the device under test, a target value (e.g., a target pressure value, a target temperature value, etc.) for the two-phase liquid cooling system and/or the device under test, and/or other operational quantities. For example, the system component 106 can provide information related to water properties associated with the liquid coolant, refrigerant properties associated with the liquid coolant and/or dielectric properties associated with the liquid coolant. In another example, the system component 106 can provide information related to pressure drop limits for the two-phase liquid cooling system and/or the device under test. In yet another example, the system component 106 can provide information related to an exit vapor quality target for the two-phase liquid cooling system and/or the device under test. In an aspect, the system component 106 can provide information indicative of an operational envelope of the device under test and/or the two-phase liquid cooling system. For example, the system component 106 can provide information indicative of one or more constraints that define a first value (e.g., a maximum value) and a second value (e.g., a minimum value) for an operational quantity related to the device under test and/or the two-phase liquid cooling system. In one example, the system component 106 can provide a maximum value and a minimum value for the water properties associated with the liquid coolant, refrigerant properties associated with the liquid coolant and/or dielectric properties associated with the liquid coolant. In another example, the system component 106 can provide a maximum value and a minimum value for the pressure drop limits. In yet another example, the system component 106 can provide a maximum value and a minimum value for temperature limits associated with the two-phase liquid cooling system and/or the device under test.

The hybrid model component 108 can generate a hybrid model for the device under test. For example, the hybrid model can be generated based on the device model provided by the device model component 104, the information provided by the system component 106 (e.g., information about the one or more operational quantities associated with the two-phase liquid cooling system and/or the device under test) and/or input data (e.g., INPUT DATA shown in FIG. 1) received or accessed by the simulation and analysis component 102. The input data can include, but is not limited to, information indicative of a 3D model of at least a portion of the device under test. In a non-limiting example, the 3D model can correspond to a 10 millimeter (mm)×100 micrometer (µm)×100 µm cross-section micro-channel portion of the device under test. The 3D model can be a 3D mesh model that comprises one or more mesh elements, vertices, edges and/or polygon faces that form a 3D representation of at least the portion of the device under test. In some embodiments, the input data can additionally or alternatively include data to facilitate performance of a detailed simulation process and/or a reduced-order simulation process that facilitates generation of the hybrid model. For example, the input data can additionally or alternatively include information indicative of one or more boundary conditions for simulating two-phase flow in the 3D model such as, for example, a boundary condition for mass flow rate at an inlet of the device under test, a boundary condition for heat generated by the device under test, a boundary condition for pressure at an outlet of the device under test and/or any of a number of boundary conditions for the device under test. Additionally or alternatively, the input data can include power map data indicative of a power map mapping one or more of supply voltage associated with the device under test, temperature of the device under test and/or other thermal characteristics associated with the device under test as a function of a location on the device under test.

In an aspect, the hybrid model component 108 can generate the hybrid model based on the detailed simulation process and the reduced-order simulation process. The detailed simulation process can be a process that generates a detailed model (e.g., a full-physics model) of thermal characteristics and/or fluid pressure characteristics (e.g., thermal properties and/or fluid pressure properties) for a portion of the device under test. The detailed model (e.g., the full-physics model) can be a model of two-phase flow in the device under test in which a fluid domain portion of the device under test (e.g., a portion of the device under test that is associated with flow of the liquid coolant) and a solid domain portion of the device under test (e.g., a portion of the device under test that is associated with silicon or another semiconductor material) are modeled in 3D. In one embodiment, the detailed model (e.g., the full-physics model) can be a Eulerian multi-phase model that predicts flow characteristics and/or heat transfer characteristics for liquid coolant provided to a device under test and/or simulates two-phase evaporative cooling through the device under test. The one or more predictions can be based on a 3D model of the device under test in some embodiments. In an aspect, the portion of the device under test associated with the detailed simulation process can be considered the first simulation domain for the device under test with a second simulation domain indicated by the reduced-order simulation process, as described below.

The reduced-order simulation process can be a process that generates a reduced-order model (e.g., a reduced-physics model) of thermal characteristics and/or fluid pressure characteristics (e.g., thermal properties and/or fluid pressure properties) for another portion of the device under test that is different than the portion of the device under test associated with the detailed model. For example, the detailed model and the reduced-order model can simulate thermal characteristics and/or fluid pressure characteristics for different sections and/or different domains of the device under test. The reduced-order model (e.g., the reduced-physics model) can be a model of two-phase flow in the device under test in which a fluid domain portion of the device under test is modeled in 1D or 2D, and a solid domain portion of the device under test is modeled in 3D. In some embodiments, the reduced-order model (e.g., the reduced-physics model) can be a cross-sectional averaged model in which a fluid portion of the device under test associated with liquid coolant is approximated in 1D or 2D, and a solid portion of the device under test associated with or having silicon or another semiconductor material is modeled in 3D. Unlike the detailed model (e.g., the full-physics model), the reduced-order model (e.g., the reduced-physics model) can be implemented without processing a two-phase flow field (e.g., a liquid phase and a vapor phase of the liquid coolant) within the device under test. As such, an amount of processing to generate the reduced-order model (e.g., the reduced-physics model) can be less than an amount of processing to generate the detailed model (e.g., the full-physics model).

The portion of the device under test associated with the reduced-order simulation process can be a second simulation domain for the device under test. The detailed simulation process can determine first thermal properties and/or first fluid pressure properties for the portion of the device under test (e.g., the first simulation domain associated with the device under test). The second simulation process can determine second thermal properties and/or second fluid pressure properties for the other portion of the device under test (e.g., the second simulation domain associated with the device under test). In one example, at least one of the first thermal properties and the second thermal properties can be corresponding thermal properties, and at least one the first fluid pressure properties and the second fluid pressure properties can be corresponding fluid pressure properties. In another example, at least one of the first thermal properties and the second thermal properties can be different thermal properties, and at least one of the first fluid pressure properties and the second fluid pressure properties can be different fluid pressure properties. In one or more embodiments, the reduced-order simulation process can be performed with less computational steps than the number of steps associated with the detailed simulation process. For example, the reduced-order simulation process can employ a smaller number of mathematical equations (e.g., mathematical equations associated with two-phase flow in the device under test) than the detailed simulation process and/or the reduced-order simulation process can process a lower number of mesh elements of the 3D model than the detailed simulation process. Furthermore, one or more embodiments of the reduced-order simulation process can be performed at a faster rate than the detailed simulation process. For example, a processor can perform the reduced-order simulation process over an interval of time (e.g., one minute) that is less than another interval of time (e.g., one hour) for performing the detailed simulation process.

The detailed simulation process can simulate two-phase flow in a solid domain portion of the device under test and/or an inlet manifold portion of the device under test. For example, the detailed simulation process can simulate two-phase flow throughout solid portions of the radial hierarchical channel structure of the device under test. The detailed simulation process can simulate two-phase flow in the solid domain portion of the device under test via a portion of the 3D model that corresponds to the solid domain portion of the device under test.

In some embodiments, the detailed simulation process can simulate two-phase flow through the inlet manifold portion the device under test via a portion of the 3D model that corresponds to the inlet manifold portion the device under test. The detailed model generated by the detailed simulation process can comprise continuity data indicative of a volume of a liquid phase of the liquid coolant flowing through the one or more channels per unit time, momentum data indicative of momentum of a liquid phase of the liquid coolant flowing through the one or more channels, energy data indicative of an amount of kinetic energy of a liquid phase of the liquid coolant flowing through the one or more channels, and/or turbulence data indicative of turbulence fluid flow of a liquid phase of the liquid coolant flowing through the one or more channels.

Additionally or alternatively, in some embodiments, the continuity data can be indicative of a volume of a vapor phase of the liquid coolant flowing through the one or more channels per unit time, the momentum data can be indicative of momentum of a vapor phase of the liquid coolant flowing through the one or more channels, the energy data can be indicative of an amount of kinetic energy of a vapor phase of the liquid coolant flowing through the one or more channels, and/or the turbulence data can be indicative of turbulence fluid flow of a vapor phase of the liquid coolant flowing through the one or more channels.

The reduced-order simulation process can simulate two-phase flow in a radial sector of the device under test. For example, the solid domain portion (e.g., the radial hierarchical channel structure) of the device under test can be divided into two or more radial sectors. The reduced-order simulation process can simulate two-phase flow in one or more radial sectors of the two or more radial sectors. The reduced-order simulation process can simulate two-phase flow in a radial sector of the device under test based on data provided by the detailed simulation process and/or experimental data provided by one or more data sources. The data provided by the detailed simulation process can include, but is not limited to, mass flow rate data indicative of a mass flow rate of the liquid coolant associated with the solid domain portion of the device under test, liquid temperature data indicative of a temperature of the liquid coolant associated with the solid domain portion, a heat flux profile indicative of a rate of heat energy transfer through the solid domain portion and/or other data determined during the detailed simulation process.

In an aspect, the reduced-order simulation process can extract one or more correlations and/or information indicative of one or more mathematical expressions from the data provided by the detailed simulation process, the experimental data and/or the 3D model. For example, the reduced-order simulation process can extract one or more parameters from the data provided by the detailed simulation process, the experimental data and/or the 3D model. The reduced-order simulation process can employ the correlations, the mathematical expressions, and/or parameters to generate the reduced-order model. For example, the reduced-order simulation process can simulate two-phase flow in the radial sector of the device under test using the correlations, the mathematical expressions, and/or the parameters.

In some embodiments, the reduced-order model generated by the detailed simulation process can comprise heat transfer data indicative of an exchange of thermal energy throughout a radial sector of the device under test (e.g., between surfaces associated with the radial sector). For example, the heat transfer data can include a heat transfer coefficient profile for the radial sector of the device under test. Additionally or alternatively, the reduced-order model generated by the detailed simulation process can comprise fluid temperature data indicative of a temperature of the liquid coolant throughout the radial sector of the device under test. For example, the fluid temperature data can include a fluid temperature profile for the radial sector of the device under test. The fluid temperature profile can indicate a temperature value at different locations of the radial sector of the device under test.

In an implementation, the detailed simulation process can be performed based on data provided to the detailed simulation process by the reduced-order simulation process. For example, the detailed simulation process can perform a next iteration of the detailed simulation process based on the heat transfer data and/or the fluid temperature data generated by the reduced-order simulation process. In another implementation, the detailed simulation process and/or the reduced-order simulation process can be sequentially iterated until a defined criterion is satisfied. For example, the detailed simulation process can be sequentially iterated until the difference between two iterations performed sequentially (e.g., the difference between a first iteration of the detailed simulation process and a second iteration of the detailed simulation process or the difference between a sixth iteration and a seventh iteration) is substantially equal to or less than a defined threshold value. Additionally or alternatively, the reduced-order simulation process can be sequentially iterated until a difference between two iterations performed sequentially (e.g., the difference between a first iteration of reduced-order simulation process and a second iteration of the reduced-order simulation process or the difference between a fourth iteration and a fifth iteration) is substantially equal to or less than a defined threshold value. The defined threshold value can be associated with a temperature of the device under test (e.g., a junction temperature of the device under test), a pressure associated with the device under test (e.g., a pressure across a channel of the device under test), and/or another characteristic associated with the device under test.

In an embodiment, the simulation and analysis component 102 can generate output data (e.g., OUTPUT DATA shown in FIG. 1). The output data can include, for example, the hybrid model that is generated based on the detailed simulation process and the reduced-order simulation process (e.g., the hybrid model that is generated based on the detailed model and the reduced-order model). The output data can also include, but is not limited to, thermal characteristics and/or fluid pressure characteristics (e.g., thermal properties and/or fluid pressure properties) for the device under test.

In a non-limiting example, a coding tool can be employed to generate a script file for sequential execution of a hybrid model. The coding tool can be, for example, a computing tool associated with a programming environment and/or a multi-paradigm numerical computing environment. The script file can include a set of operating commands for the sequential execution of the hybrid model. Furthermore, the script file can be executed by a computer-aided analysis tool. The computer-aided analysis tool can be, for example, a computational fluid dynamics analysis tool associated with a virtual computer-aided environment that provides a 3D rendering of the hybrid model and/or graphical elements associated with fluid dynamics analysis of the hybrid model. In an implementation, the script file can execute a subroutine associated with one or more defined simulation model files (e.g., one or more previously-generated model files). The one or more defined simulation model files can be, for example, one or more definition files and/or one or more thermo-mechanical simulation files. The one or more defined simulation model files can be modified and/or appended before being executed. The script file can also facilitate extraction of information from a detailed model (e.g., a full-physics model) and/or can apply the information to a reduced-order model (e.g., a reduced-physics model). Moreover, the script file can also be employed to define and/or monitor a number of sequences that are performed between the detailed model and the reduced-order model to satisfy a defined criterion (e.g., a convergence criterion) associated with the detailed model and/or the reduced-order model. Additionally or alternatively, the script file can be employed to augment information transfer between the detailed model and the reduced-order model to facilitate a reduction in an amount of time to satisfy a defined criterion (e.g., a convergence criterion) associated with the detailed model and/or the reduced-order model.

Figure 2:
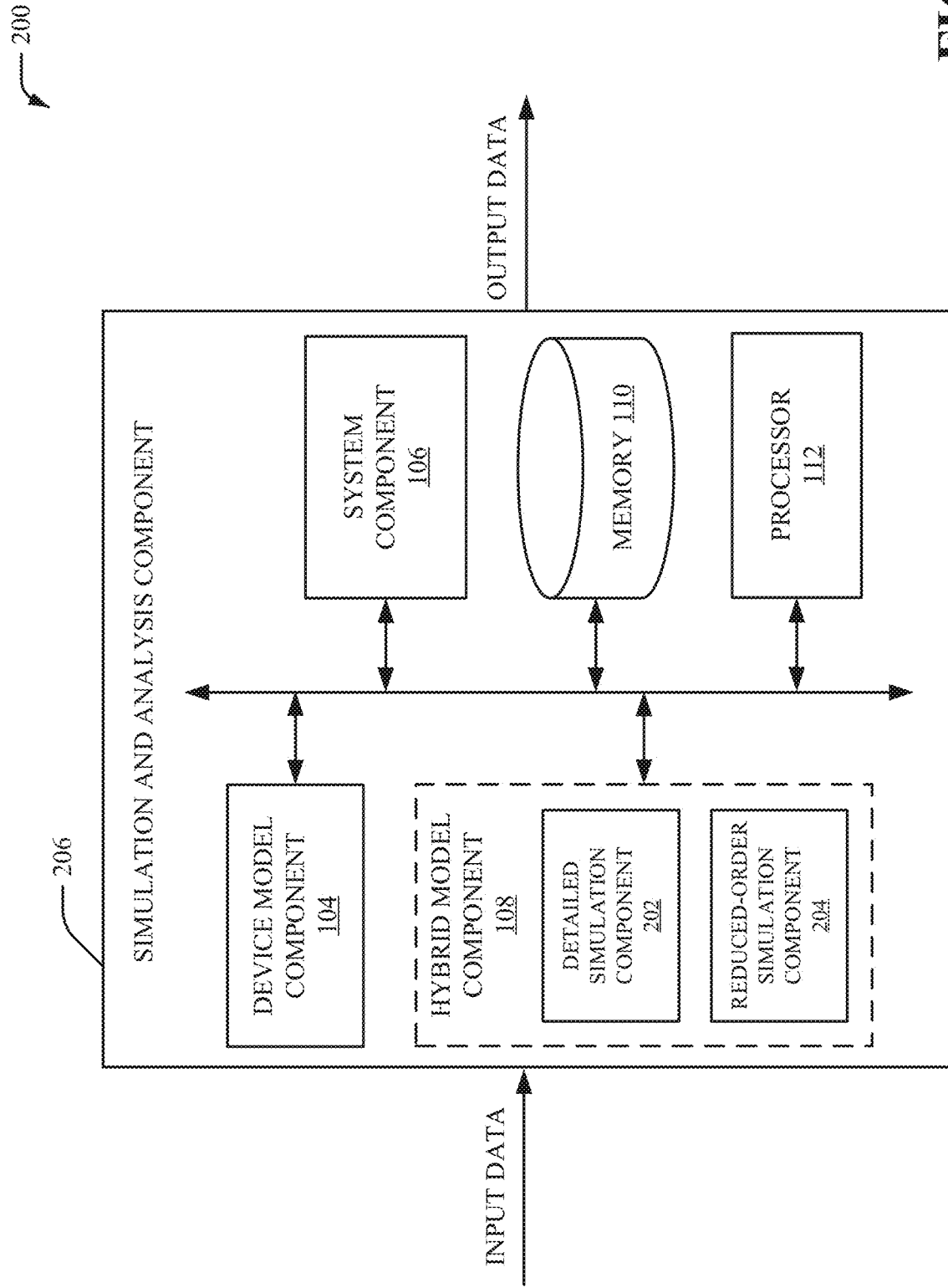
FIG. 2 illustrates a block diagram of another example, non-limiting simulation and analysis component in accordance with one or more embodiments described herein.

FIG. 2 illustrates another block diagram of an example, non-limiting system 200 in accordance with one or more embodiments described herein. Repetitive description of like elements employed in other embodiments described herein is omitted for sake of brevity.

In the embodiment shown in FIG. 2, the system 200 includes the simulation and analysis component 206. As shown, the simulation and analysis component 206 can include one or more of the components and/or functionality of simulation and analysis component 102 in various embodiments. In the embodiment shown, simulation and analysis component 206 can include the device model component 104, the system component 106 and the hybrid model component 108. The hybrid model component 108 of simulation and analysis component 206 can include a detailed simulation component 202 and a reduced-order simulation component 204. The detailed simulation component 202 can perform the detailed simulation process associated with the hybrid model component 108. For example, the detailed simulation component 202 can simulate two-phase flow in the solid domain portion of the device under test and/or the inlet manifold portion of the device under test. The detailed simulation process performed by the detailed simulation component 202 can be a thermal simulation of two-phase flow in the solid domain portion of the device under test and/or the inlet manifold portion of the device under test. Furthermore, the detailed simulation process performed by the detailed simulation component 202 can include one or more iterative simulations of two-phase flow in the solid domain portion of the device under test and/or the inlet manifold portion of the device under test. The detailed simulation component 202 simulate two-phase flow in the solid domain portion of the device under test based on a 3D mesh model of the solid domain portion of the device under test. In one example, the 3D mesh model of the solid domain portion of the device under test can be an approximately uncompressed 3D mesh model (e.g., a high resolution 3D mesh model) of the solid domain portion of the device under test. Additionally or alternatively, the detailed simulation component 202 can simulate two-phase flow in the inlet manifold portion of the device under test based on a 3D mesh model of the inlet manifold portion of the device under test. The 3D mesh model of the inlet manifold portion of the device under test can be, for example, an approximately uncompressed 3D mesh model (e.g., a high resolution 3D mesh model) of the inlet manifold portion of the device under test.

The detailed simulation component 202 can simulate two-phase flow in the solid domain portion of the device under test and/or the inlet manifold portion of the device under test based on one or more material properties of the device under test, one or more boundary conditions of the device under test and/or a defined residual target for the thermal simulation.

The one or more material properties can include, but are not limited to, one or more properties of silicon included in the device under test, one or more properties of glass included in the device under test, one or more properties of another semiconductor material of the device under test, one or more properties of another insulator material of the device under test, and/or one or more other material properties of the device under test. The one or more material properties can also include, but are not limited to, one or more properties of the liquid coolant in a liquid state and/or one or more properties of the liquid coolant in a vapor state.

The one or more boundary conditions can include, but are not limited to, a defined threshold value for mass flow rate, a maximum threshold value for mass flow rate, a defined threshold value for inlet temperature, a maximum threshold value for inlet temperature, a defined threshold value of outlet pressure, a maximum threshold value of outlet pressure, a total heat input value, and/or one or more other boundary conditions. In a non-limiting example, the one or more boundary conditions can include a mass flow rate of 15 kilograms (kg)/hour (hr) at a domain inlet of the device under test, a coolant inlet temperature of 25° C., a background heat flux of 20 Watts (W)/centimeter squared ($cm^2$), core heat flux of 300 $W/cm^2$, a hot spot heat flux of 1000 $W/cm^2$, a reference pressure (e.g., 450 kPa), a relative outlet pressure of 10 kPa at an orifice outlet of the device under test, a relative pressure of 20 kPa at another orifice outlet of the device under test, a relative pressure of 85 kPa at another orifice outlet of the device under test, a heat transfer coefficient of 25000 W/meter squared ($m^2$)/Kelvin (K) and fluid temperature of 27° C. at surfaces of the device under test corresponding to an interface of radial sections and solid-domains (e.g., walls of the device under test), etc. The defined residual target can be, for example, a defined root mean square residual target (e.g., a root mean square residual target of 0.0001). It should be understood that the above values and parameters are mere examples and the embodiments described herein are not limited to such values.

For the solid domain portion of the device under test, the detailed simulation component 202 can determine continuity data indicative of a volume of a liquid phase of the liquid coolant flowing through the solid domain portion of the device under test, momentum data indicative of momentum of a liquid phase of the liquid coolant flowing through the solid domain portion of the device under test, energy data indicative of an amount of kinetic energy of a liquid phase of the liquid coolant flowing through the solid domain portion of the device under test, and/or turbulence data indicative of turbulence fluid flow through the solid domain portion of the device under test. In an implementation, the continuity data can include continuity information (e.g., a continuity equation) associated with the solid domain portion of the device under test, the momentum data can include momentum information (e.g., one or more momentum equations) associated with the solid domain portion of the device under test (e.g., a momentum equation for an x-direction associated with the solid domain portion of the device under test, a momentum equation for a y-direction associated with the solid domain portion of the device under test, and a momentum equation for a z-direction associated with the solid domain portion of the device under test), the energy data can include energy information (e.g., an energy equation) associated with the solid domain portion of the device under test, and the turbulence data can include turbulence information (e.g., one or more turbulence equations such as one or more k-epsilon equations and one or more k-omega equations) associated with the solid domain portion of the device under test. The continuity equation, the set of momentum equations, the energy equation and the set of turbulence equations can be 3D equations in some embodiments.

For the inlet manifold portion of the device under test, the detailed simulation component 202 can determine continuity data indicative of a volume of a liquid phase of the liquid coolant flowing through the inlet manifold portion of the device under test, momentum data indicative of momentum of a liquid phase of the liquid coolant flowing through the inlet manifold portion of the device under test, energy data indicative of an amount of kinetic energy of a liquid phase of the liquid coolant flowing through the inlet manifold portion of the device under test, and/or turbulence data indicative of turbulence fluid flow through the inlet manifold portion of the device under test. In an implementation, the momentum data can include first data associated with a first direction (e.g., x-direction) of the inlet manifold portion of the device under test, second data associated with a second direction (e.g., y-direction) of the inlet manifold portion of the device under test, and third data associated with a third direction (e.g., z-direction) of the inlet manifold portion of the device under test.

Based on the detailed simulation process performed by the detailed simulation component 202 for the solid domain portion of the device under test and/or the inlet manifold portion of the device under test, the detailed simulation component 202 can determine mass flow rate data indicative of a mass flow rate of the liquid coolant associated with the solid domain portion of the device under test, liquid temperature data indicative of a temperature of the liquid coolant associated with the solid domain portion of the device under test, and/or a heat flux profile indicative of a rate of heat energy transfer through the solid domain portion of the device under test. Additionally or alternatively, the mass flow rate data can be indicative of a mass flow rate of the liquid coolant associated with the inlet manifold portion of the device under test, liquid temperature data indicative of a temperature of the liquid coolant associated with the inlet manifold portion of the device under test, and/or a heat flux profile indicative of a rate of heat energy transfer through the inlet manifold portion of the device under test. In an implementation, based on the detailed simulation performed by the detailed simulation component 202, the detailed simulation component 202 can determine a mass flow rate and/or a liquid temperature at an outlet of each orifice associated with the solid domain portion of the device under test. Furthermore, based on the detailed simulation performed by the detailed simulation component 202, the detailed simulation component 202 can determine a heat flux profile at one or more surfaces of the device under test corresponding to interfaces (e.g., walls) associated with solid domain portion of the device under test.

In another aspect, the detailed simulation component 202 can determine one or more other parameters associated with the solid domain portion of the device under test such as, but not limited to, a junction temperature associated with the solid domain portion of the device under test, a maximum junction temperature associated with the solid domain portion of the device under test, an input power associated with the solid domain portion of the device under test, a total input power associated with the solid domain portion of the device under test, another thermal parameter associated with the solid domain portion of the device under test, and/or another electrical parameter associated with the solid domain portion of the device under test. The detailed simulation component 202 can also determine one or more other parameters associated with the inlet manifold portion of the device under test such as, but not limited to, a junction temperature associated with the inlet manifold portion of the device under test, a maximum junction temperature associated with the inlet manifold portion of the device under test, an input power associated with the inlet manifold portion of the device under test, a total input power associated with the inlet manifold portion of the device under test, another thermal parameter associated with the inlet manifold portion of the device under test, and/or another electrical parameter associated with the inlet manifold portion of the device under test. The detailed simulation component 202 can generate the detailed model (e.g., the full-physics model) based on the continuity data, the momentum data, the energy data, and/or the turbulence data for the solid domain portion of the device under test and/or the inlet manifold portion of the device under test. For example, the detailed model generated by the detailed simulation component 202 can include the mass flow rate data, the liquid temperature data, and/or the heat flux profile for the solid domain portion of the device under test and/or the inlet manifold portion of the device under test.

The reduced-order simulation component 204 can perform the reduced-order simulation process associated with the hybrid model component 108. The reduced-order simulation process performed by the reduced-order simulation component 204 can be a thermal simulation of two-phase flow in the radial sector of the device under test. Furthermore, the reduced-order simulation process performed by the reduced-order simulation component 204 can include one or more iterative simulations of two-phase flow in the radial sector of the device under test.

In some embodiments, the reduced-order simulation component 204 can simulate two-phase flow in the radial sector of the device under test based on data generated by the detailed simulation component 202 and/or the experimental data provided by one or more data sources. For example, the reduced-order simulation component 204 can simulate two-phase flow in a radial sector of the device under test based on the mass flow rate data generated by the detailed simulation component 202, the liquid temperature data generated by the detailed simulation component 202, the heat flux profile generated by the detailed simulation component 202, and/or the experimental data. In an implementation, the reduced-order simulation component 204 can determine a heat flux profile at surfaces of the device under test, in which the surfaces correspond to interfaces of radial sectors from the radial sector of the device under test. Additionally or alternatively, the reduced-order simulation component 204 can determine one or more other parameters associated with the device under test such as, but not limited to, a junction temperature at the radial sector of the device under test, a maximum junction temperature at the radial sector of the device under test, an input power at the radial sector of the device under test, a total input power at the radial sector of the device under test, another thermal parameter associated with the radial sector of the device under test, and/or another electrical parameter associated with the radial sector of the device under test.

In an aspect, the reduced-order simulation component 204 can extract information indicative of one or more correlations and/or one or more mathematical expressions from the data generated by the detailed simulation component 202, the experimental data and/or the 3D model for the device under test. The one or more correlations can be inferences determined for thermal properties and/or fluid properties included in the detailed simulation component 202, the experimental data and/or the 3D model for the device under test. The one or more mathematical expressions can be equations that describe thermal properties and/or fluid properties determined from the detailed simulation component 202, the experimental data and/or the 3D model for the device under test. For example, the reduced-order simulation component 204 can extract information indicative of one or more parameters (e.g., one or more thermal parameters, one or more fluid parameters, one or more pressure parameters, etc.) from the data generated by the detailed simulation component 202, the experimental data (e.g., one or more previously determined thermal parameters for the device under test and/or the liquid coolant, one or more previously determined fluid parameters for the device under test and/or the liquid coolant, one or more previously determined pressure parameters for the device under test and/or the liquid coolant, etc.) and/or the 3D model for the device under test. The reduced-order simulation component 204 can employ the information indicative of the correlations, the mathematical expressions, and/or the one or more parameters to generate the reduced-order model (e.g., the reduced-physics model). The reduced-order model generated by the reduced-order simulation component 204 can comprise heat transfer data indicative of an exchange of thermal energy throughout the radial sector of the device under test (e.g., between walls of the device under test). For example, the heat transfer data can include a heat transfer coefficient profile for the radial sector of the device under test. Additionally or alternatively, the reduced-order model generated by the reduced-order simulation component 204 can comprise fluid temperature data indicative of a temperature of the liquid coolant throughout the radial sector of the device under test. For example, the fluid temperature data can include a fluid temperature profile for the radial sector of the device under test.

In another aspect, the reduced-order simulation component 204 can validate the reduced-order simulation generated by the reduced-order simulation component 204 against the experimental data. For example, the reduced-order simulation component 204 can determine whether data associated with the reduced-order simulation generated by the reduced-order simulation component 204 matches a portion of the experimental data.

In an embodiment, the detailed simulation component 202 can employ the heat transfer coefficient profile, the fluid temperature profile and/or the pressure drop values determined by the reduced-order simulation component 204. As used herein, the term "pressure drop value" means a difference in pressure between a first location (e.g., a first location of the device under test or the two-phase liquid cooling system) and a second location (e.g., a second location of the device under test or the two-phase liquid cooling system). For example, the detailed simulation component 202 can perform a next iteration of the thermal simulation based on the heat transfer coefficient profile, the fluid temperature profile and/or the pressure drop values determined by the reduced-order simulation component 204. The detailed simulation component 202 can also perform a next iteration of the thermal simulation for an inlet manifold and/or a solid domain of the device under test based on the one or more material properties, the one or more boundary conditions and/or the defined residual target. As used herein, the term "residual target" means a defined target value for a parameter associated with the device under test and/or the two-phase liquid cooling system. Additionally, the detailed simulation component 202 can determine relative pressures at various orifice outlets of the device under test based on the pressure drop values. In certain implementations, the detailed simulation component 202 can determine a weighted average of the pressure drop values to define a pressure drop value for a portion of the device under test. For example, the detailed simulation component 202 can determine a pressure drop value for a particular orifice outlet of the device under test by determining an average outlet pressure for the particular orifice outlet over a certain number of iterations of the thermal simulation (e.g., by calculating an average of a first pressure drop value at the particular orifice outlet for a first iteration of the thermal simulation, a second pressure drop value at the particular orifice outlet for a second iteration of the thermal simulation, a third pressure drop value at the particular orifice outlet for a third iteration of the thermal simulation).

In another embodiment, the detailed simulation component 202 can perform one or more other iterations of the thermal simulation until a defined criterion is satisfied. For example, the detailed simulation component 202 can perform one or more other iterations of the thermal simulation until a defined threshold value for a number of iterations is reached (e.g., the detailed simulation component 202 can perform the thermal simulation until 50 iterations of the thermal simulation is completed, etc.). In another example, the detailed simulation component 202 can perform one or more other iterations of the thermal simulation until a defined threshold value for the defined residual target for the pressure drop values is reached (e.g., the detailed simulation component 202 can perform the thermal simulation until a residual target for the pressure drop values is 0.001 or less). In yet another example, the detailed simulation component 202 can perform one or more other iterations of the thermal simulation until a defined threshold value for the mass flow rate values is reached (e.g., the detailed simulation component 202 can perform the thermal simulation until a residual target for the mass flow rate values is 0.001 or less).

The hybrid model component 108 can generate the hybrid model of two-phase flow in device under test based on the detailed simulation process generated by the detailed simulation component 202 and the reduced-order simulation process generated by the reduced-order simulation component 204. For example, the hybrid model can comprise data for a simulation of two-phase flow in the solid domain portion of the device under test, the inlet manifold portion of the device under test, and the radial sector of the device under test. Therefore, the hybrid model generated by the hybrid model component 108 can comprise thermohydraulic information, pressure drop information, flow distribution information of liquid coolant, heat transfer characteristics, momentum loss behavior of liquid coolant, fluid temperature information for liquid coolant, etc. for a solid domain of the device under test (e.g., a silicon domain of the device under test), a fluid domain of an inlet manifold region of the device under test, a fluid domain of an inlet orifice region associated with the device under test (e.g., a portion of the device under test that begins at an inlet manifold of the device under test and ends at approximately an outlet of an orifice of the device under test), and/or a porous domain of the device under test (e.g., radial sectors of the device under test). A porous domain of the device under test can be, for example, a portion of the device under test associated with flow of the liquid coolant.

Figure 3:
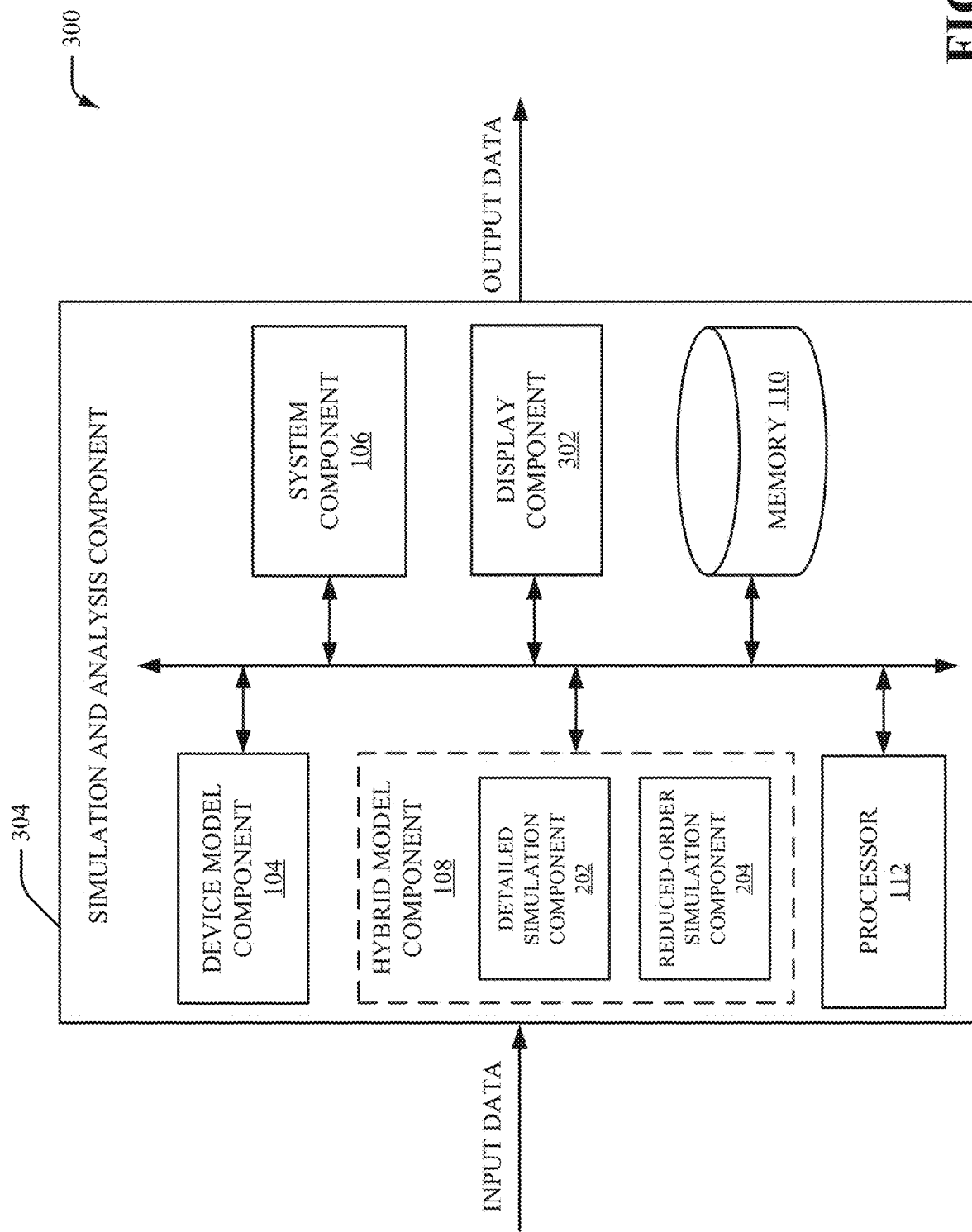
FIG. 3 illustrates a block diagram of yet another example, non-limiting simulation and analysis component in accordance with one or more embodiments described herein.

FIG. 3 illustrates another block diagram of an example, non-limiting system 300 in accordance with one or more embodiments described herein. Repetitive description of like elements employed in other embodiments described herein is omitted for sake of brevity.

In the embodiment shown in FIG. 3, the system 300 includes the simulation and analysis component 102. The simulation and analysis component 304 can include one or more of the structure and/or functionality of the simulation and analysis component 102, 206 (or vice versa). In the embodiment shown, simulation and analysis component 304 can include the device model component 104, the system component 106, the hybrid model component 108 and a display component 302. The hybrid model component 108 can include the detailed simulation component 202 and the reduced-order simulation component 204.

The display component 302 can generate a visual rendering associated with the hybrid model for display on a user interface. For example, the display component 302 can generate, via a user interface, a display of a rendering of a graphical model of the device under test based on the hybrid model. The user interface can be associated with a display of a user device such as, but not limited to, a computing device, a computer, a desktop computer, a laptop computer, a monitor device, a smart device, a smart phone, a mobile device, a handheld device, a tablet, a portable computing device or another type of user device associated with a display. In an example, the output data generated by the simulation and analysis component 304 can include the rendering associated with the hybrid model for display on the user interface of the simulation and analysis component 304.

In an aspect, the display component 302 can generate a display that simulates two-phase flow in the device under test and/or facilitates cooling design trade-off analysis of the device under test. The display component 302 can present at least a portion of the device under test as a 3D model. Alternatively, the display component 302 can present a 2D representation of at least a portion of the device under test. The display component 302 can alter visual characteristics (e.g., hues, shading, etc.) of at least a portion of the device under test that is presented via the user interface based on the hybrid model generated by the hybrid model component 108. For example, different degrees of velocity of liquid coolant flowing through the device under test can be presented as different hues or shades based on the hybrid model generated by the hybrid model component 108, different degrees of pressure within the device under test can be presented as different hues or shades based on the hybrid model generated by the hybrid model component 108, different degrees of temperature within the device under test can be presented as different hues or shades based on the hybrid model generated by the hybrid model component 108, etc. In one example, the display component 302 can generate a rendering of velocity streamlines in an inlet manifold portion of the device under test based on the hybrid model. In another example, the display component 302 can generate a rendering of a pressure profile for the device under test based on the hybrid model. In yet another example, the display component 302 can generate a rendering of a local coolant temperature profile for the radial sector of the device under test based on the hybrid model.

Figure 4:
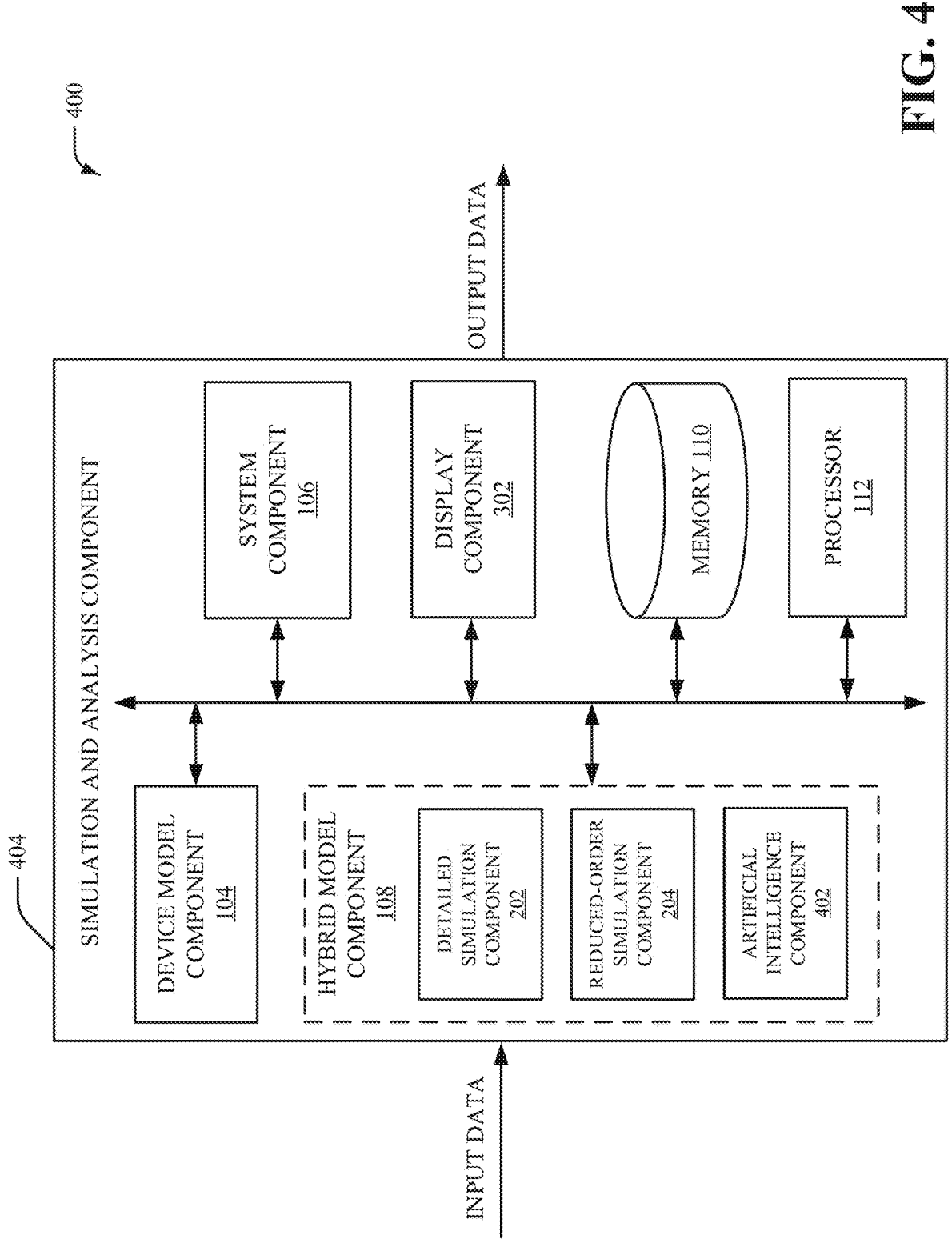
FIG. 4 illustrates a block diagram of yet another example, non-limiting simulation and analysis component in accordance with one or more embodiments described herein.

FIG. 4 illustrates another block diagram of an example, non-limiting system 400 in accordance with one or more embodiments described herein. Repetitive description of like elements employed in other embodiments described herein is omitted for sake of brevity.

In the embodiment shown in FIG. 4, the system 400 includes the simulation and analysis component 102. The simulation and analysis component 404 can include one or more of the structure and/or functionality of the simulation and analysis component 102, 206, 304 (or vice versa). The simulation and analysis component 404 can include the device model component 104, the system component 106, the hybrid model component 108, the display component 302. The hybrid model component 108 can include the detailed simulation component 202, the reduced-order simulation component 204 and an artificial intelligence component 402.

The detailed simulation component 202 and/or the reduced-order simulation component 204 can employ the artificial intelligence component 402 to perform the detailed simulation process and/or the reduced-order simulation process. For example, the reduced-order simulation component 204 can extract information indicative of correlations and/or mathematical expressions from the data generated by the detailed simulation component 202 based on the artificial intelligence component 402. To facilitate the detailed simulation process and/or the reduced-order simulation process, the artificial intelligence component 402 can employ principles of artificial intelligence to facilitate extracting correlations, inferences and/or mathematical expressions from data. The artificial intelligence component 402 can perform learning with respect to the detailed simulation process and/or the reduced-order simulation process explicitly or implicitly. The learning and/or generated inferences by the artificial intelligence component 402 can also facilitate parameter extraction by the reduced-order simulation component 204.

The artificial intelligence component 402 can also employ an automatic classification system and/or an automatic classification process to facilitate the detailed simulation process and/or the reduced-order simulation process. For example, the artificial intelligence component 402 can employ a probabilistic and/or statistical-based analysis (e.g., factoring into the analysis utilities and costs) to learn and/or generate inferences with respect to the detailed simulation process and/or the reduced-order simulation process. The artificial intelligence component 402 can employ, for example, a support vector machine (SVM) classifier to learn and/or generate inferences for the detailed simulation process and/or the reduced-order simulation process. Additionally or alternatively, the artificial intelligence component 402 can employ other classification techniques associated with Bayesian networks, decision trees and/or probabilistic classification models. Classifiers employed by the artificial intelligence component 402 can be explicitly trained (e.g., via a generic training data) as well as implicitly trained (e.g., via receiving extrinsic information). For example, with respect to SVM's, SVM's can be configured via a learning or training phase within a classifier constructor and feature selection module. A classifier can be a function that maps an input attribute vector, x=(x1, x2, x3, x4, xn), to a confidence that the input belongs to a class—that is, f(x)=confidence (class).

In an aspect, the artificial intelligence component 402 can include an inference component that can further enhance automated aspects of the artificial intelligence component 402 utilizing in part inference based schemes to facilitate learning and/or generating inferences for the detailed simulation process and/or the reduced-order simulation process. The artificial intelligence component 402 can employ any suitable machine-learning based techniques, statistical-based techniques and/or probabilistic-based techniques. For example, the artificial intelligence component 402 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the artificial intelligence component 402 can perform a set of machine learning computations associated with the detailed simulation process and/or the reduced-order simulation process. For example, the artificial intelligence component 402 can perform a set of clustering machine learning computations, a set of decision tree machine learning computations, a set of instance-based machine learning computations, a set of regression machine learning computations, a set of regularization machine learning computations, a set of rule learning machine learning computations, a set of Bayesian machine learning computations, a set of deep Boltzmann machine computations, a set of deep belief network computations, a set of convolution neural network computations, a set of stacked auto-encoder computations and/or a set of different machine learning computations. In an exemplary embodiment, a script file associated with a hybrid model (e.g., a script file generated for sequential execution of a hybrid model) can be created, modified and/or optimized by the artificial intelligence component 402 based on a set of machine learning computations such as, for example, a set of clustering machine learning computations, a set of decision tree machine learning computations, a set of instance-based machine learning computations, a set of regression machine learning computations, a set of regularization machine learning computations, a set of rule learning machine learning computations, a set of Bayesian machine learning computations, a set of deep Boltzmann machine computations, a set of deep belief network computations, a set of convolution neural network computations, a set of stacked auto-encoder computations and/or a set of different machine learning computations.

It is to be appreciated that the simulation and analysis component 404 can execute a sequence of instructions (e.g., a thread of execution) that cannot be performed by a human (e.g., is greater than the capability of a single human mind). For example, an amount of data processed, a speed of processing of data and/or data types processed by the simulation and analysis component 404 over a certain period of time can be greater, faster and different than an amount, speed and data type that can be processed by a single human mind over the same period of time. Furthermore, data processed by the simulation and analysis component 404 can be encoded data (e.g., a sequence of binary bits) and/or compressed data. The simulation and analysis component 404 can also be fully operational towards performing one or more other functions (e.g., fully powered on, fully executed, etc.) while also processing the above-referenced sequence of instructions and/or data.

Figure 5:
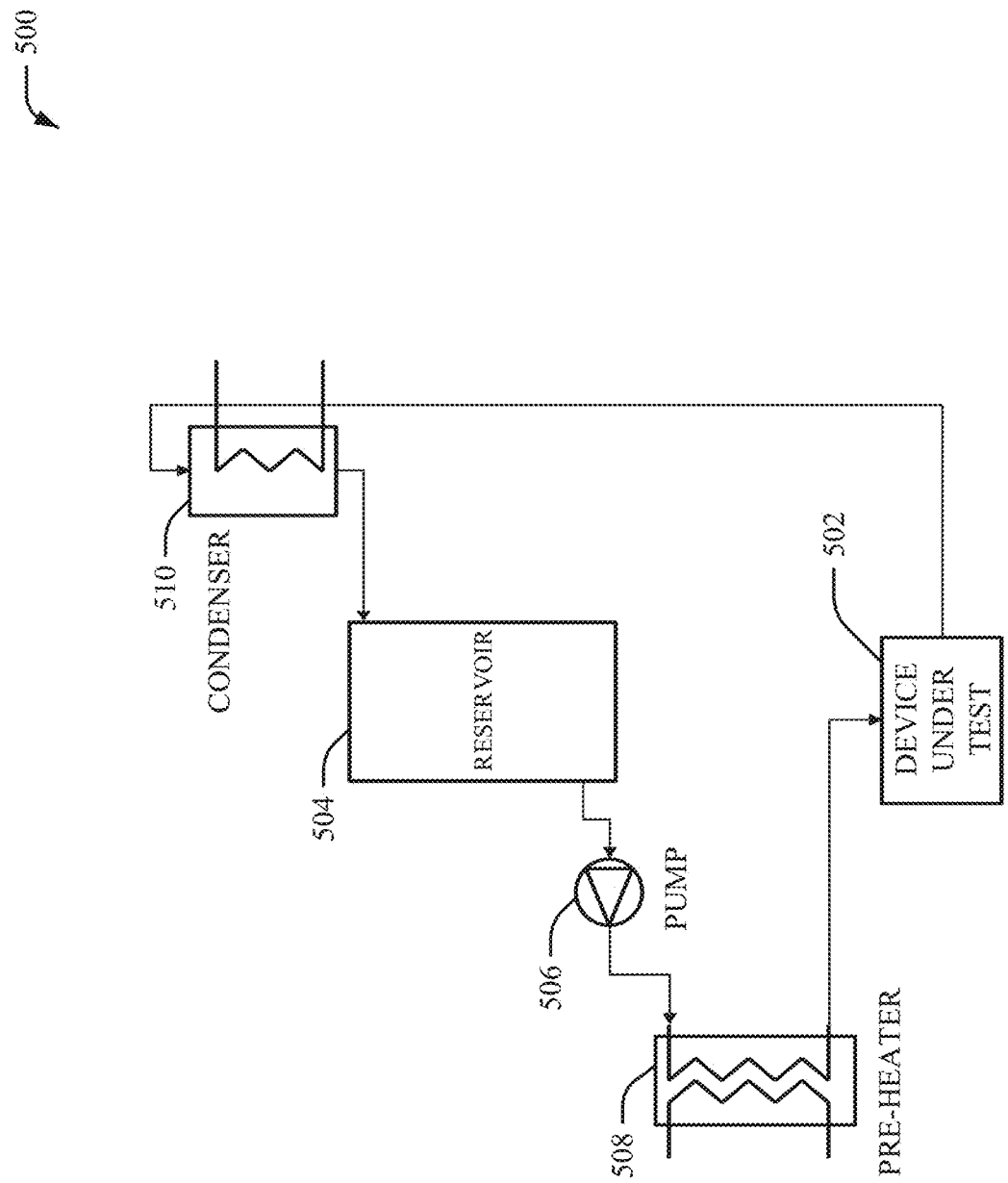
FIG. 5 illustrates a block diagram of an example, non-limiting system that facilitates two-phase liquid cooling of a device under test in accordance with one or more embodiments described herein.

FIG. 5 illustrates an example, non-limiting system 500 that facilitates two-phase liquid cooling of a device under test in accordance with one or more embodiments described herein. Repetitive description of like elements employed in other embodiments described herein is omitted for sake of brevity.

In the embodiment shown in FIG. 5, the system 500 includes a device under test 502, a reservoir 504, a pump 506, a pre-heater 508, and a condenser 510. The device under test 502 can be an electronic device package such as, for example, a 3D stacked electronic chip. The device under test 502 can comprise a central fluid distribution manifold coupled to a radial hierarchical channel structure. Therefore, a path for liquid coolant can be provided in the device under test 502. In one example, a channel for liquid coolant can be formed in the device under test 502 by bonding two silicon chips. In an aspect, the device under test 502 can be a device under test that is simulated and/or analyzed by the simulation and analysis component 102. In another aspect, the device model component 104 can generate a device model of the device under test 502. For example, the device model component 104 can determine properties of the device under test 502 such as power dissipation properties (e.g., voltage properties, current properties and/or power properties associated with power dissipation, different power dissipation values for different locations of the device under test, etc.) for the device under test 502, structural properties (e.g., a type of material that forms the device under test, a design of the device under test, electronic and/or mechanical elements of the device under test, etc.) for the device under test 502, electronic properties (e.g., a number of electronic elements, a type of electronic elements, values of electronic elements, electrical connections, current flow, etc.) for the device under test 502, other properties for the device under test 502, etc.

The device under test 502 can generate heat in response to being operated and/or processing data. The heat generated by the device under test 502 can be generated as a function of the properties for the device under test 502. The reservoir 504, the pump 506, the pre-heater 508, and/or the condenser 510 can be implemented as a two-phase cooling system for the device under test 502. For example, reservoir 504, the pump 506, the pre-heater 508, and/or the condenser 510 can be implemented as a pumped two-phase cooling loop that provides liquid coolant to the device under test. The reservoir 504 can store the liquid coolant. In one example, the liquid coolant stored by the reservoir 504 can be water. In another example, the liquid coolant stored by the reservoir 504 can be a refrigerant. In yet another example, the liquid coolant stored by the reservoir 504 can be a dielectric coolant. The liquid coolant stored by the reservoir 504 can be provided to the device under test 502. In an implementation, the liquid coolant stored by the reservoir 504 can be provided to the device under test 502 (e.g., directly to an inlet of the device under test 502) via a pump 506. For example, the pump 506 can pump the liquid coolant from the reservoir 504 to the device under test 502. However, in another implementation, the pre-heater 508 can control a temperature of the liquid coolant that is provided to the device under test 502. For example, the pump 506 can pump the liquid coolant from the reservoir 504 to the pre-heater 508 and the pre-heater 508 can provide the liquid coolant to the device under test 502.

The liquid coolant can enter the device under test 502 as single phase liquid. The liquid coolant provided to the device under test 502 can be employed by the device under test 502 to reduce a temperature of the device under test 502 and/or to offset the heat generated by the device under test 502. The liquid coolant provided to the device under test 502 can be transformed into a liquid-vapor mixture (e.g., a two-phase mixture) as the liquid coolant flows through the device under test 502. For example, the liquid coolant can undergo boiling as the liquid coolant flows through cooling structures within the device under test 502. The liquid coolant can exit the device under test 502 as a liquid-vapor mixture (e.g., a two-phase mixture). The condenser 510 can condense the vapor exiting from the device under test 502. In certain implementations, the condenser 510 can transfer heat from the device under test 502 to an external cooling loop (not shown). Liquid from the condenser 510 can flow into the reservoir 504. The liquid from the reservoir 504 can then be pumped back into the device under test 502 employing the pump 506.

Figure 6:
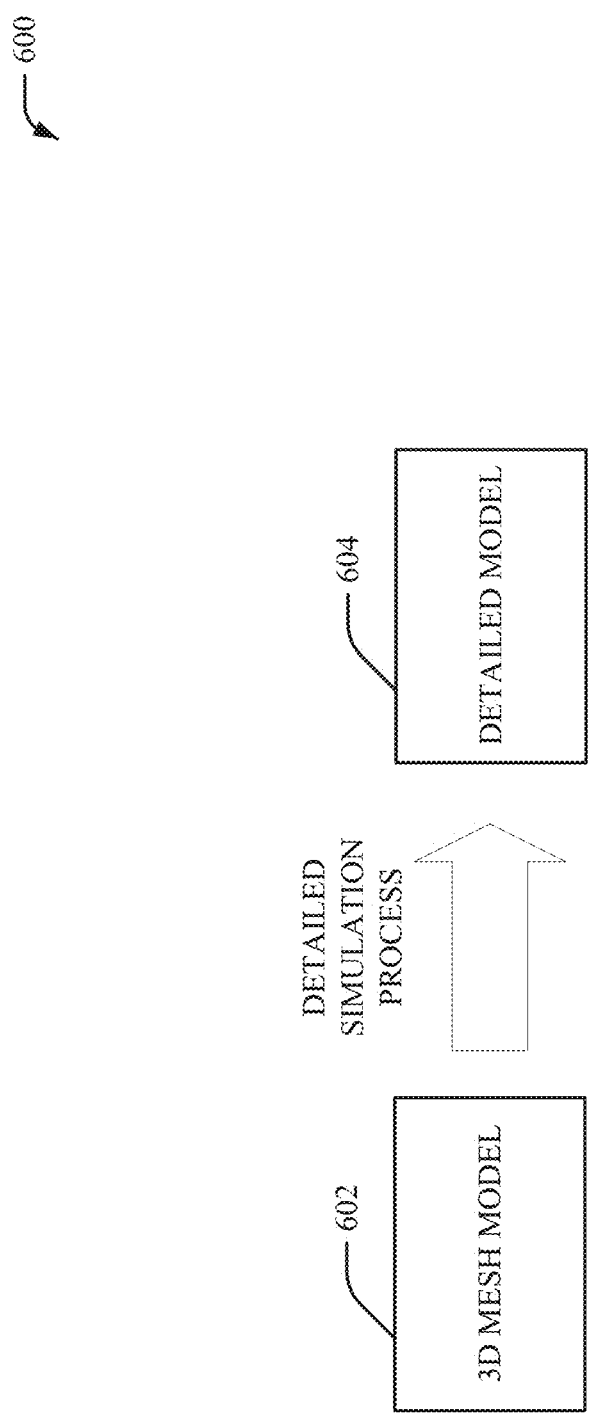
FIG. 6 illustrates an example, non-limiting diagram of generation of a detailed model in accordance with one or more embodiments described herein.

FIG. 6 illustrates an example, non-limiting diagram 600 of generation of a detailed model in accordance with one or more embodiments described herein. Repetitive description of like elements employed in other embodiments described herein is omitted for sake of brevity.

The diagram 600 can be associated with the detailed simulation component 202. A 3D mesh model 602 can be employed by a detailed simulation process of the detailed simulation component 202. The 3D mesh model 602 can be a 3D representation of at least a portion of the device under test (e.g., the device under test 502). The 3D mesh model 602 can comprise one or more mesh elements that define a shape and/or structure of at least a portion of the device under test. For example, the 3D mesh model 602 can include one or more vertices, edges and/or polygon faces that form a 3D representation of at least the portion of the device under test.

Based on analysis of the 3D mesh model 602 via the detailed simulation process, the detailed simulation component 202 can generate a detailed model 604. The detailed simulation process can analyze flow of a liquid phase of the liquid coolant and/or flow a vapor phase of the liquid coolant through the device under test by employing the 3D mesh model 602. The detailed simulation process can determine thermal properties and/or fluid pressure properties of the device under test and/or the liquid coolant based on the 3D mesh model 602. The detailed model 604 can simulate two-phase evaporative cooling through the device under test associated with the 3D mesh model 602. For example, the detailed model 604 can simulate two-phase evaporative cooling through chip embedded micro-scale cavities of the device under test. The detailed model 604 can also facilitate prediction of flow characteristics and/or heat transfer characteristics for liquid coolant flowing through the device under test. The detailed model 604 can be associated with a solid portion of the device under test that comprises a silicon structure. Additionally or alternatively, the detailed model 604 can be associated with an inlet manifold portion of the device under test. The detailed model 604 can provide a model of two-phase flow in the solid portion of the device under test and/or the inlet manifold portion of the device under test. For example, the detailed model 604 can provide a mass flow rate of liquid coolant through the solid portion of the device under test and/or the inlet manifold portion of the device under test, the detailed model 604 can provide a liquid temperature of a liquid coolant through the solid portion of the device under test and/or the inlet manifold portion of the device under test, the detailed model 604 can provide a heat flux profile for the solid portion of the device under test and/or the inlet manifold portion of the device under test.

In an embodiment, the detailed model 604 can be, for example, a Eulerian multiphase model that comprises continuity data indicative of a volume of a liquid phase of the liquid coolant flowing through the solid portion and/or the inlet manifold portion per unit time, momentum data indicative of momentum of a liquid phase of the liquid coolant flowing through the solid portion and/or the inlet manifold portion, and/or energy data indicative of an amount of kinetic energy of a liquid phase of the liquid coolant flowing through the solid portion and/or the inlet manifold portion. Additionally or alternatively, the continuity data can be indicative of a volume of a vapor phase of the liquid coolant flowing through the solid portion and/or the inlet manifold portion per unit time, the momentum data can be indicative of momentum of a vapor phase of the liquid coolant flowing through the solid portion and/or the inlet manifold portion, and/or the energy data can be indicative of an amount of kinetic energy of a vapor phase of the liquid coolant flowing through the solid portion and/or the inlet manifold portion.

In another embodiment, the detailed model 604 can comprise one or more sub-models. For example, the detailed model 604 can comprise an inter-phase drag model that captures drag of the liquid coolant throughout the device under test (e.g., the solid portion and/or the inlet manifold portion of the device under test), a continuum surface force model that captures force on surfaces of the device under test (e.g., the solid portion and/or the inlet manifold portion of the device under test), and/or a heat and mass transfer model that captures heat and mass transfer across a fluid-solid interface of the device under test (e.g., the solid portion and/or the inlet manifold portion of the device under test). The detailed model 604 can also comprise a mixture turbulence model that captures turbulent interaction between a liquid phase of the liquid coolant and a vapor phase of the liquid coolant throughout the device under test (e.g., the solid portion and/or the inlet manifold portion of the device under test).

Figure 7:
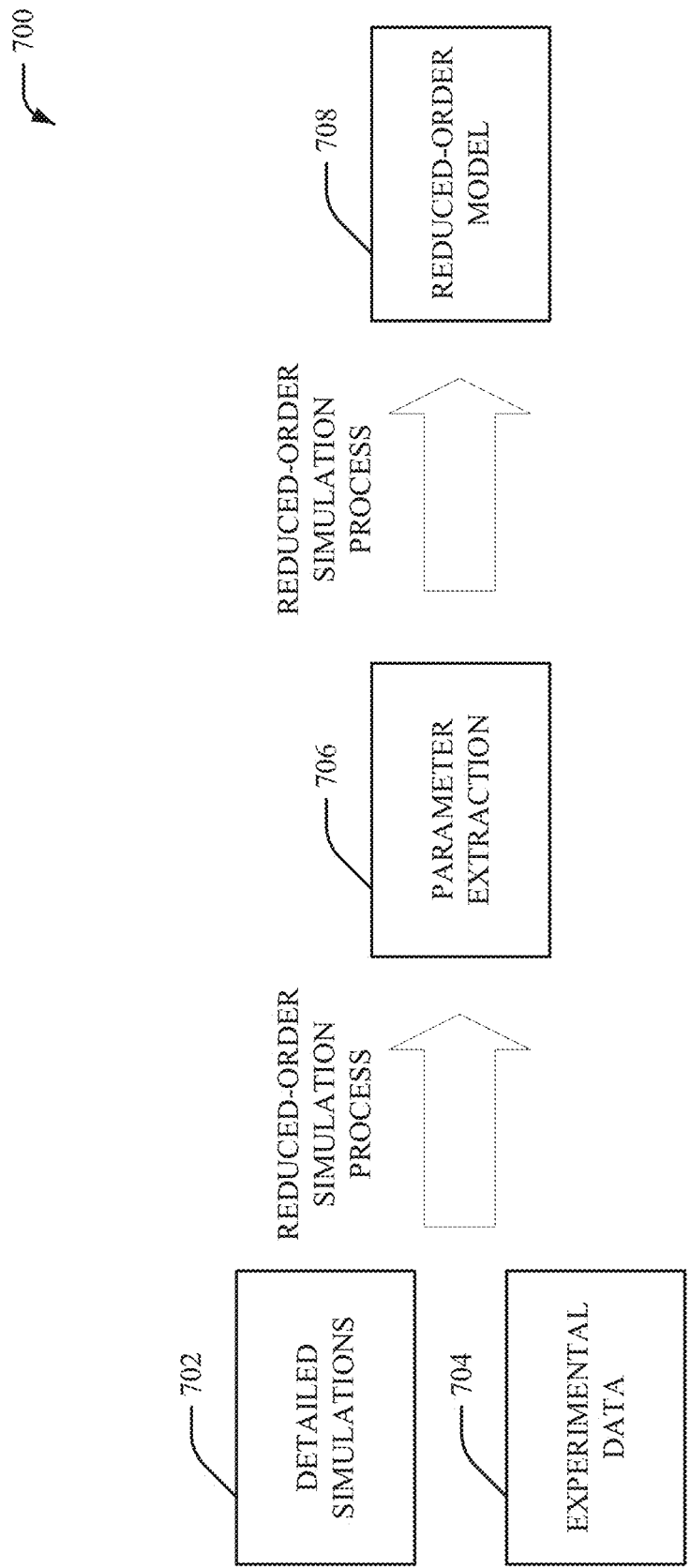
FIG. 7 illustrates an example, non-limiting diagram of generation of a reduced-order model in accordance with one or more embodiments described herein.

FIG. 7 illustrates an example, non-limiting diagram 700 of generation of a reduced-order model in accordance with one or more embodiments described herein. Repetitive description of like elements employed in other embodiments described herein is omitted for sake of brevity.

The diagram 700 can be associated with the reduced-order simulation component 204. Detailed simulations 702 and experimental data 704 can be employed by a reduced-order simulation process of the reduced-order simulation component 204. The detailed simulations 702 can be generated by the detailed simulation component 202. Furthermore, the detailed simulations 702 can be employed to generate the detailed model 604. The experimental data 704 can be obtained from one or more data sources. For example, the experimental data can be obtained from one or more publically available data sources, published literature, research archives, specification publications and/or another data source that are stored in one or more databases.

Based on the detailed simulations 702 and the experimental data 704, the reduced-order simulation process performed by the reduced-order simulation component 204 can perform parameter extraction 706. For example, one or more parameters and/or one or more parameter values can be extracted (e.g., by the reduced-order simulation component 204) based on the detailed simulations 702 and/or the experimental data 704. Additionally or alternatively, one or more mathematical equations can be determined (e.g., by the reduced-order simulation component 204) based on the detailed simulations 702 and/or the experimental data 704. The one or more parameters can include one or more thermal parameters, one or more fluid pressure parameters, and/or one or more other parameters that facilitate two-phase flow analysis of liquid coolant through the device under test. The one or more parameters can be related to heat transfer within the device under test. For example, the one or more parameters can be related to an exchange of thermal energy between a first portion of the device under test and a second portion of the device under test. Additionally or alternatively, the one or more parameters can be related to fluid pressure of a liquid coolant that flows through the device under test.

A reduced-order model 708 can be generated based on the parameter extraction 706. The reduced-order model 708 can be, for example, a reduced-physics model that models fluid characteristics of a liquid coolant flowing through the device under test in 1D or 2D, and models characteristics of a solid structure of the device under test in 3D. The reduced-order model 708 can simulate two-phase evaporative cooling through a portion of the device under test that is different than another portion of the device under test associated with the detailed model 604. The reduced-order model 708 can also facilitate prediction of flow characteristics and/or heat transfer characteristics for liquid coolant flowing through the portion of the device under test that is different than another portion of the device under test associated with the detailed model 604. The reduced-order model 708 can be associated with a radial sector of the device under test that corresponds to a radial quadrant for a radial hierarchical channel structure of the device under test. The reduced-order model 708 can provide a model of two-phase flow in the radial sector of the device under test. For example, the reduced-order model 708 can provide a mass flow rate of liquid coolant through the radial sector of the device under test, the reduced-order model 708 can provide a liquid temperature of a liquid coolant through the radial sector of the device under test, the reduced-order model 708 can provide a heat flux profile for the radial sector of the device under test.

Figure 8:
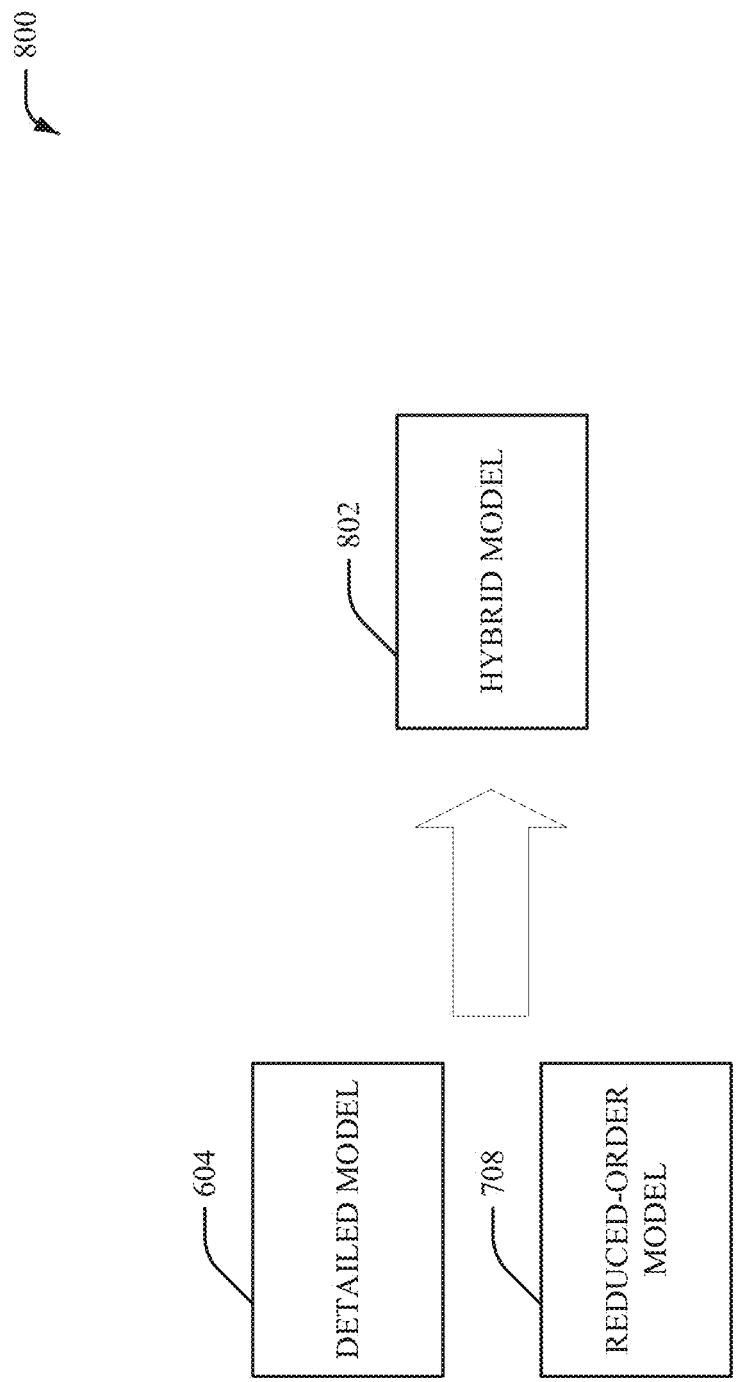
FIG. 8 illustrates an example, non-limiting diagram of generation of a hybrid model in accordance with one or more embodiments described herein.

FIG. 8 illustrates an example, non-limiting diagram 800 of generation of a hybrid model in accordance with one or more embodiments described herein. Repetitive description of like elements employed in other embodiments described herein is omitted for sake of brevity.

The diagram 800 can be associated with the hybrid model component 108. In an aspect, a hybrid model 802 can be generated based on the detailed model 604 and the reduced-order model 708. The hybrid model 802 can be a model of two-phase flow in a device under test (e.g., the device under test 502). For example, the hybrid model 802 can comprise data for a simulation of two-phase flow in the solid domain portion of the device under test, the inlet manifold portion of the device under test, and the radial sector of the device under test. The hybrid model 802 can comprise thermal properties for the device under test, fluid pressure properties for the device under test, thermohydraulic information for the device under test, pressure information for the device under test, flow distribution information of liquid coolant throughout the device under test, heat transfer characteristics of the device under test, momentum loss behavior of liquid coolant throughout the device under test, fluid temperature information for liquid coolant throughout the device under test and/or other information for the device under test. As such, the hybrid model 802 can provide information regarding thermo-hydraulic performance of a device under test (e.g., the device under test 502). Furthermore, the hybrid model 802 can facilitate trade-off analysis and/or design optimization of a device under test (e.g., the device under test 502). For example, the hybrid model 802 can be rendered on a user interface via the display component 302 and/or can be further processed by one or more analysis techniques.

Figure 9:
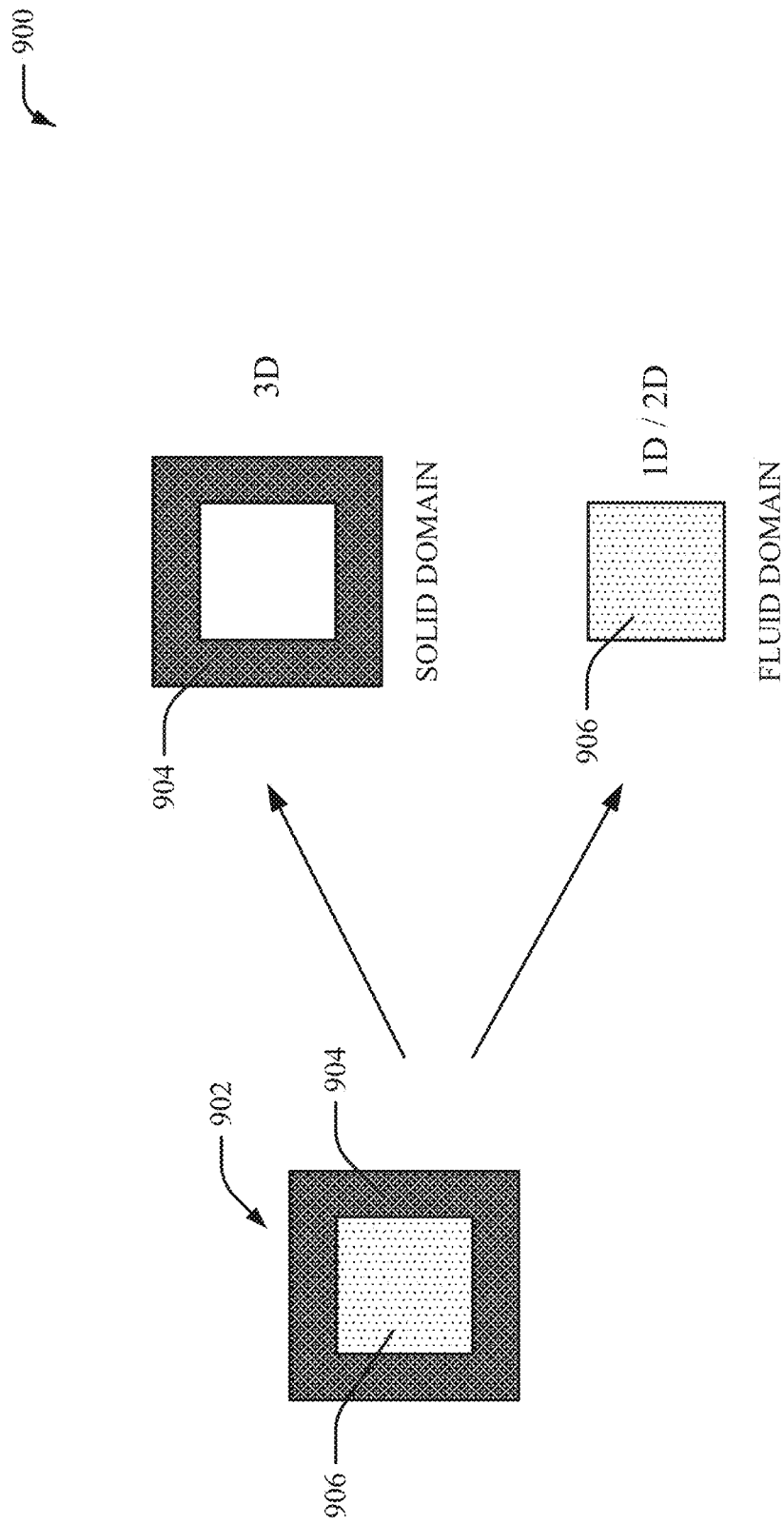
FIG. 9 illustrates another example, non-limiting diagram of generation of a reduced-order model in accordance with one or more embodiments described herein.

FIG. 9 illustrates an example, non-limiting diagram 900 of generation of a reduced-order model in accordance with one or more embodiments described herein. Repetitive description of like elements employed in other embodiments described herein is omitted for sake of brevity.

The diagram 900 can be associated with the reduced-order simulation component 204. The diagram 900 includes a channel 902. The channel 902 can be a portion of a device under test (e.g., the device under test 502) and, in some embodiments, can include a wall portion 904 and an orifice portion 906. The wall portion 904 can comprise semiconductor material such as, for example, silicon. The orifice portion 906 can be a passage in the channel 902 and liquid coolant can flow through the orifice portion 906. The wall portion 904 can be associated with a solid domain of the channel 902 and the orifice portion 906 can be associated with a fluid domain of the channel 902. The reduced-order simulation component 204 can analyze the wall portion 904 via a first simulation technique and the orifice portion 906 via a second simulation technique. In an aspect, the reduced-order simulation component 204 can simulate the wall portion 904 (e.g., the solid domain of the channel 902) in 3D. For example, the reduced-order simulation component 204 can analyze a 3D model of the wall portion 904. Furthermore, the reduced-order simulation component 204 can simulate the orifice portion 906 (e.g., the fluid domain of the channel 902) in 1D or 2D. For example, the reduced-order simulation component 204 can analyze the orifice portion 906 based on a set of correlations and/or a set of mathematical equations determined for the orifice portion 906.

Figure 10:
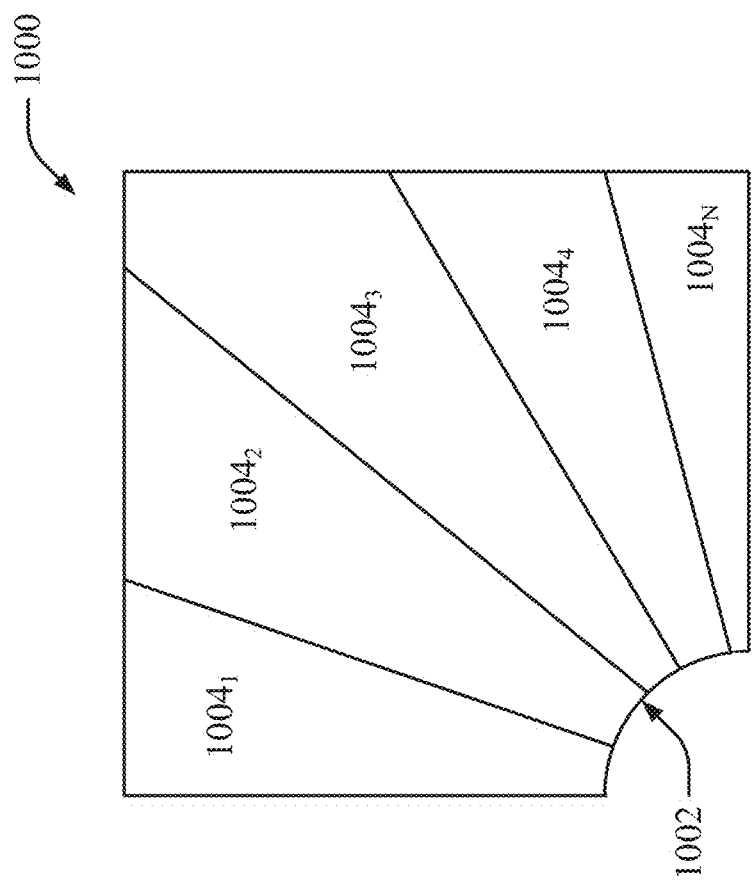
FIG. 10 illustrates an example, non-limiting cross-section of a device under test in accordance with one or more embodiments described herein.

FIG. 10 illustrates an example, non-limiting cross-section of a device under test 1000 in accordance with one or more embodiments described herein. Repetitive description of like elements employed in other embodiments described herein is omitted for sake of brevity.

The cross-section of the device under test 1000 can include an inlet manifold portion 1002 and radial sectors $1004_{1-N}$. In a non-limiting example, the cross-section of the device under test 1000 can be a 10 mm×100 μm×100 μm uniform cross-section micro-channel portion of a device under test. The inlet manifold portion 1002 can be a central fluid distribution manifold that supplies liquid coolant to a one or more channels associated with the radial sectors 1004$_{1-N}$, in which liquid coolant can flow through the radial sectors 1004$_{1-N}$ via the one or more channels. The radial sectors 1004$_{1-N}$ can be associated with a radial hierarchical channel structure that includes one or more orifices, one or more pin fins, one or more nozzles, one or more guiding structures, one or more embedded micro-scale cavities and/or a set of outlets for the liquid coolant.

Figure 11:
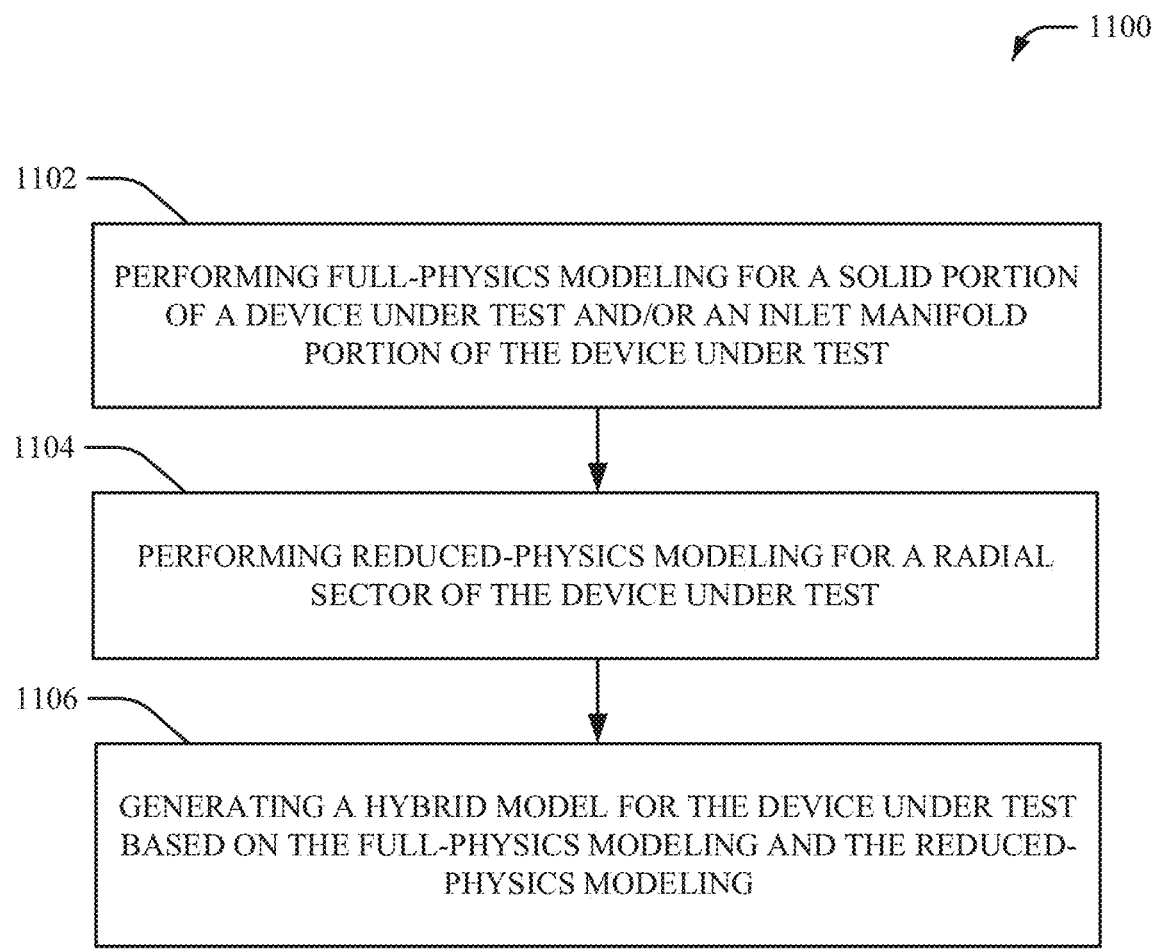
FIG. 11 illustrates an example, non-limiting flow diagram of an example, non-limiting computer-implemented method that facilitates generating a hybrid model in accordance with one or more embodiments described herein.

FIG. 11 illustrates a flow diagram of an example, non-limiting computer-implemented method 1100 that facilitates generating a hybrid model in accordance with one or more embodiments described herein. At 1102, full-physics modeling for a solid portion of a device under test and/or an inlet manifold portion of the device under test is preformed (e.g., by a detailed simulation component 202). For example, simulation of two-phase flow in the solid portion of a device under test and/or the inlet manifold portion of the device under test can be preformed based on a 3D model of the device under test. At 1104, reduced-physics modeling for a radial sector of the device under test is performed (e.g., by a reduced-order simulation component 204). For example, simulation of two-phase flow in the radial sector of the device under test can be preformed based on a set of correlations and/or a set of mathematical equations determined from the full-physics modeling. At 1106, a hybrid model for the device under test is generated (e.g., by a hybrid model component 108) based on the full-physics modeling and the reduced-physics modeling. For example, the hybrid model can provide thermal characteristics, pressure characteristics, and/or velocity characteristics of two-phase flow in the device under test by employing the full-physics modeling and the reduced-physics modeling.

Figure 12:
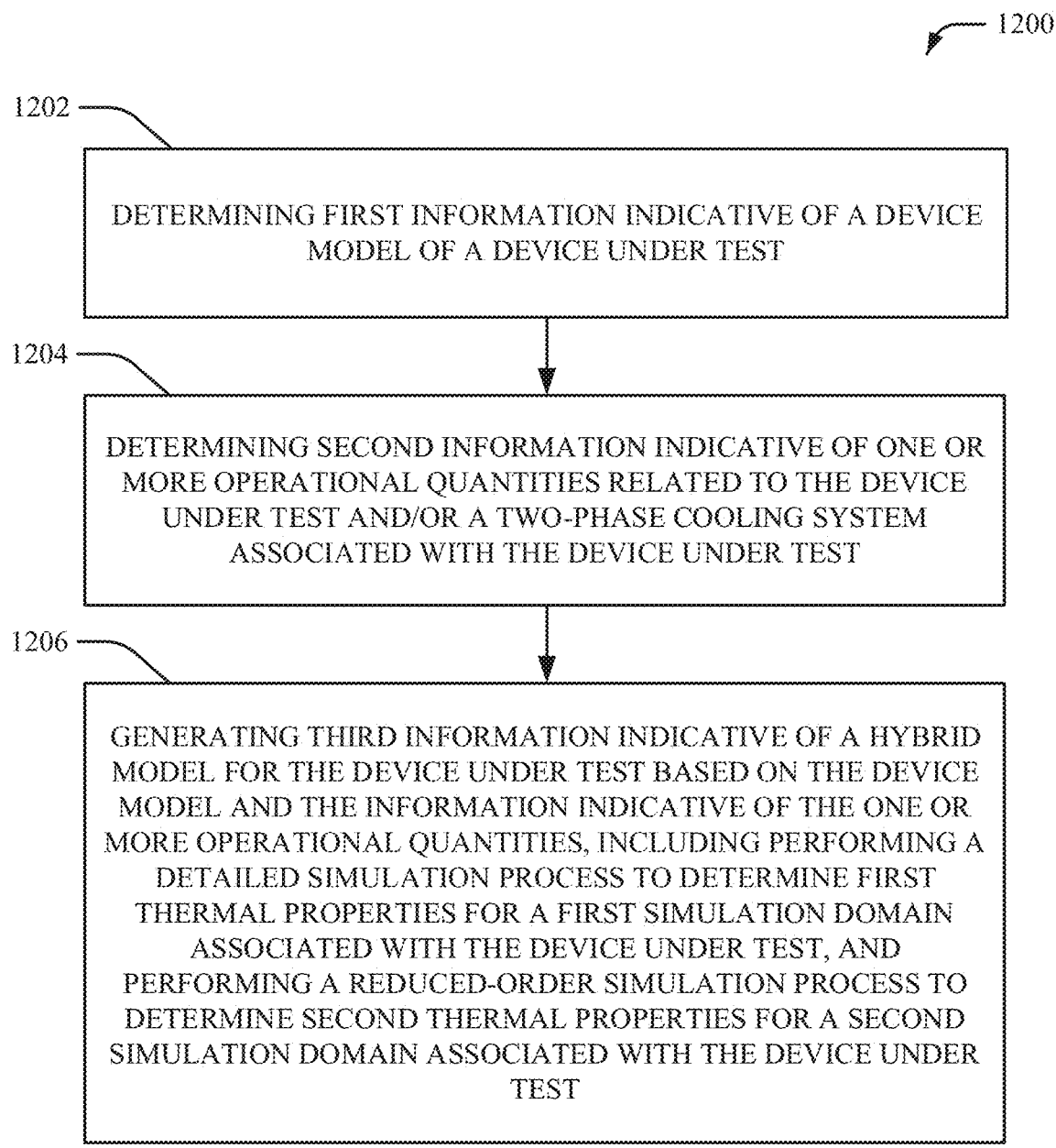
FIG. 12 illustrates a flow diagram of another example, non-limiting computer-implemented method that facilitates generating a hybrid model in accordance with one or more embodiments described herein.

FIG. 12 illustrates a flow diagram of an example, non-limiting computer-implemented method 1200 that facilitates generating a hybrid model in accordance with one or more embodiments described herein. At 1202, first information indicative of a device model of a device under test is determined (e.g., by a device model component 104). For example, the device model can provide properties for the device under test such as, but not limited to, power dissipation properties for the device under test, geometric dimensions for the device under test, structural properties for the device under test, electrical properties for the device under test, other properties for the device under test, etc. The device under test can be an electronic device package with a cooling structure that receives liquid coolant to facilitate reduction of heat generated by the electronic device package.

At 1204, second information indicative of one or more operational quantities related to the device under test and/or a two-phase cooling system associated with the device under test is determined (e.g., by a system component 106). For example, the one or more operational quantities can include, but is not limited to specification data for liquid coolant received by the device under test, pressure limit data indicative of a first pressure drop limit and third information indicative of a second pressure drop limit for the device under test, vapor quality data indicative of a vapor quality threshold value for vapor generated by the device under test in response to receipt of the liquid coolant, etc.

At 1206, third information indicative of a hybrid model for the device under test is generated (e.g., by a hybrid model component 108) based on the device model and the information indicative of the one or more operational quantities. For example, a model that provides thermal characteristics, pressure characteristics, and/or velocity characteristics of the device under test in response to liquid coolant being provided to the device under test can be generated based on the device model and the information indicative of the one or more operational quantities. In an aspect, a detailed simulation process is performed (e.g., by a detailed simulation component 202) to determine first thermal properties for a first simulation domain associated with the device under test. In another aspect a reduced-order simulation process is performed (e.g., by a reduced-order simulation component 204) to determine second thermal properties for a second simulation domain associated with the device under test. The reduced-order simulation process can comprise a lower number of computational steps than computational steps associated with the detailed simulation process. For example, the reduced-order simulation process can analyze a lower number of mesh elements (e.g., mesh elements associated with a 3D model of the device under test) than the detailed simulation process. Furthermore, the reduced-order simulation process can be performed by determining correlations from the detailed simulation process.

Figure 13:
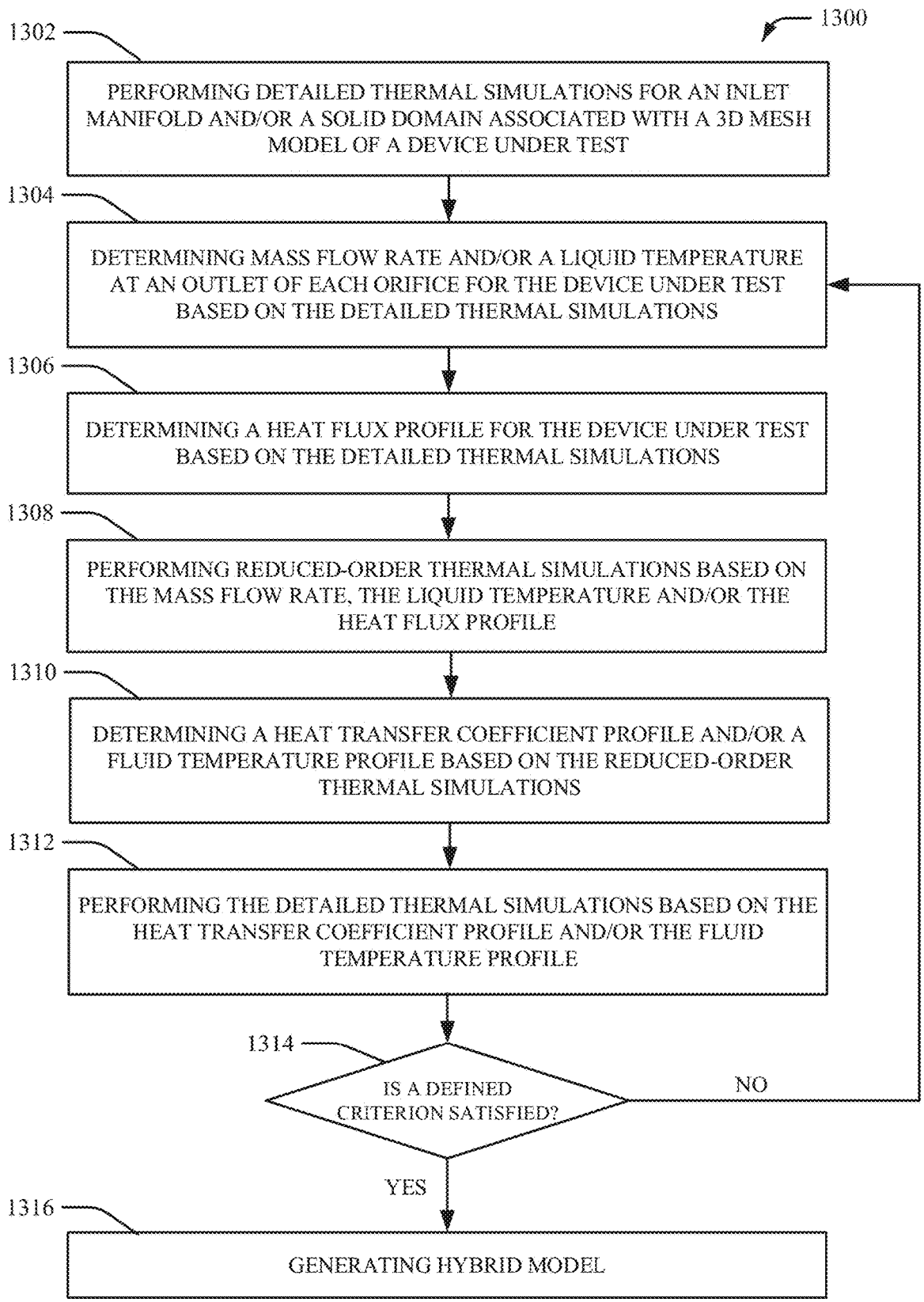
FIG. 13 illustrates a flow diagram of yet another example, non-limiting computer-implemented method that facilitates generating a hybrid model in accordance with one or more embodiments described herein.

FIG. 13 illustrates a flow diagram of an example, non-limiting computer-implemented method 1300 that facilitates generating a hybrid model in accordance with one or more embodiments described herein. At 1302, detailed thermal simulations for an inlet manifold and/or a solid domain associated with a 3D mesh model of a device under test are performed (e.g., by a detailed simulation component 202). Additionally or alternatively, detailed fluid pressure simulations for the inlet manifold and/or the solid domain can be performed. For example, two-phase flow of liquid coolant through the device under test (e.g., flow of a liquid phase of the liquid coolant and/or a vapor phase of the liquid coolant through the device under test) can be analyzed using the 3D mesh model.

At 1304, mass flow rate and/or a liquid temperature at an outlet of each orifice for the device under test is determined (e.g., by a detailed simulation component 202) based on the detailed thermal simulations. For example, mass flow rate and/or a liquid temperature of the liquid coolant can be analyzed at an outlet of each orifice for the device under test represented by the 3D mesh model.

At 1306, a heat flux profile for the device under test is determined (e.g., by a detailed simulation component 202) based on the detailed thermal simulations. For example, a heat flux profile for silicon surfaces of the device under test can be determined based on the 3D mesh model.

At 1308, reduced-order thermal simulations are performed (e.g., by a reduced-order simulation component 204) based on the mass flow rate, the liquid temperature and/or the heat flux profile. For example, a set of correlations, a set of thermal parameters, a set of fluid pressure parameters, and/or a set of mathematical equations can be determined based on the mass flow rate, the liquid temperature and/or the heat flux profile generated in response to the detailed thermal simulations.

At 1310, a heat transfer coefficient profile and/or a fluid temperature profile is determined (e.g., by a reduced-order simulation component 204) based on the reduced-order thermal simulations. For example, the reduced-order thermal simulations can generate thermal information for the device under test and/or the liquid coolant provided to the device under test.

At 1312, the detailed thermal simulations are performed (e.g., by a detailed simulation component 202) based on the heat transfer coefficient profile and/or the fluid temperature profile. For example, a next iteration of the detailed thermal simulations can be performed based on the heat transfer coefficient profile and/or the fluid temperature profile determined in response to the reduced-order thermal simulations.

At 1314, it is determined whether a defined criterion is satisfied. For example, it can be determined whether a junction temperature of the device under test has reached a defined threshold level, whether pressure at a particular location of the device under test has reached a defined threshold level, whether a number of iterations for the detailed thermal simulations has reached a defined threshold level, whether a difference between a first iteration of the detailed thermal simulations and a second iteration of the detailed thermal simulations has reached a defined threshold level, etc. If no, method 1300 returns to 1004. If yes, method 1300 proceeds to 1316. At 1316, a hybrid model is generated (e.g., by a hybrid model component 108). For example, the hybrid model that provides a two-phase flow model for the device under test can be generated based on mass flow rates generated by the detailed thermal simulations, liquid temperatures generated by the detailed thermal simulations, a heat flux profile generated by the detailed thermal simulations, a heat transfer coefficient profile generated by the reduced-order thermal simulations and/or a fluid temperature profile generated by the reduced-order thermal simulations.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because modeling and/or simulations of two-phase flow in a device under test (e.g., full-physics modeling, reduced-physics modeling, generating a hybrid model, performing a detailed simulation process, performing a reduced-order simulation process, performing detailed thermal simulations, performing reduced-order thermal simulations, etc.) are established from a combination of electrical and mechanical components and circuitry, a human is unable to replicate or perform processing performed by the simulation and analysis component 102 (e.g., the device model component 104, the system component 106, the hybrid model component 108, the detailed simulation component 202, the reduced-order simulation component 204, the display component 302, the artificial intelligence component 402, etc.). For example, a human is unable to decode and/or process an encoded sequence of instructions (e.g., an encoded thread of execution) associated with a sequence of bits. Furthermore, a human is unable to communicate data and/or packetized data for performing modeling and/or simulations of two-phase flow with respect to a 3D model of a device under test.

Figure 14:
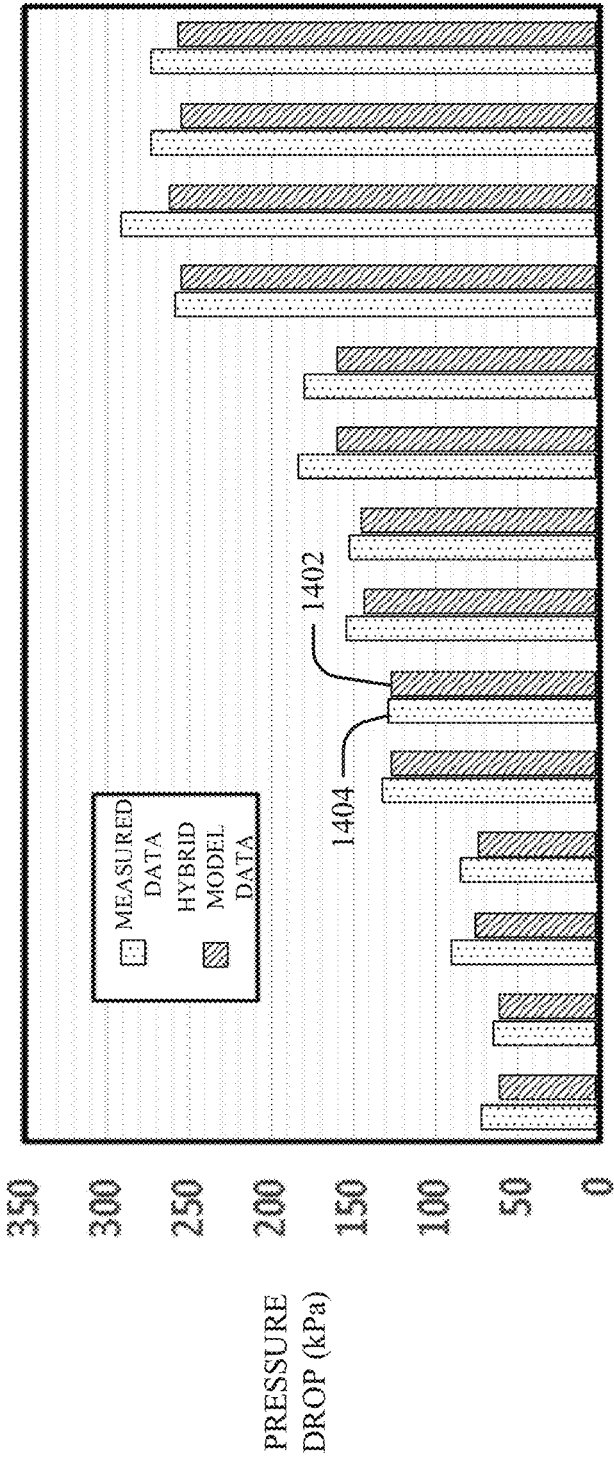
FIG. 14 illustrates a graph showing pressure drop comparison between measured data and hybrid model data in accordance with one or more embodiments described herein.

FIG. 14 illustrates a graph 1400 showing a pressure drop comparison between measured data and hybrid model data in accordance with one or more embodiments described herein. A horizontal axis of the graph 1400 depicts various test cases associated with different devices under test. A vertical axis of the graph 1400 depicts a pressure drop measured in kilopascal (kPa). The measured data depicted in the graph 1400 can be data measured from a device under test via one or more sensors and/or one or more measuring devices. The hybrid model data depicted in the graph 1400 can be hybrid model data generated by the hybrid model component 108. As shown by the graph 1400, in various embodiments, a pressure drop value determined by the hybrid model component 108 for a device under test approximately corresponds to another pressure drop value determined by the measured data. For example, a pressure drop value 1402 determined by the hybrid model component 108 for a particular device under test associated with a test case number 6 approximately corresponds to a pressure drop value 1404 determined by the measured data.

Figure 15:
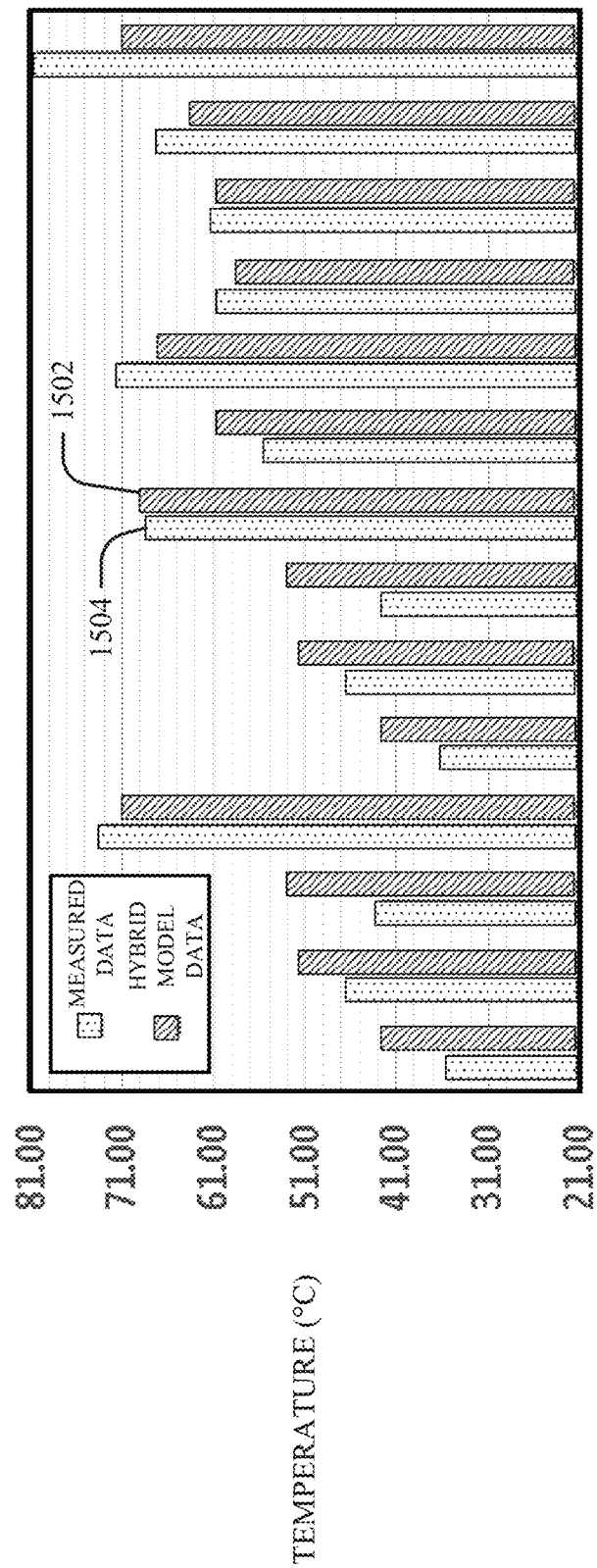
FIG. 15 illustrates a graph showing maximum temperature comparison between measured data and hybrid model data in accordance with one or more embodiments described herein.

FIG. 15 illustrates a graph 1500 showing a maximum temperature comparison between measured data and a hybrid model data in accordance with one or more embodiments described herein. A horizontal axis of the graph 1500 depicts various test cases associated with different devices under test. A vertical axis of the graph 1500 depicts maximum temperature measured in degrees Celsius (° C.). The measured data depicted in the graph 1500 can be data measured from a device under test via one or more sensors and/or one or more measuring devices, for example. The hybrid model data depicted in the graph 1500 can be hybrid model data generated by the hybrid model component 108. As shown by the graph 1500, in various embodiments, a maximum temperature value determined by the hybrid model component 108 for a device under test approximately corresponds to a maximum temperature value determined by the measured data. For example, a maximum temperature value 1502 determined by the hybrid model component 108 for a particular device under test associated with a test case number 8 approximately corresponds to a maximum temperature value 1504 determined by the measured data. Accordingly, one or more embodiments described herein can efficiently control and/or reduce temperature for a device under test.

Figure 16:
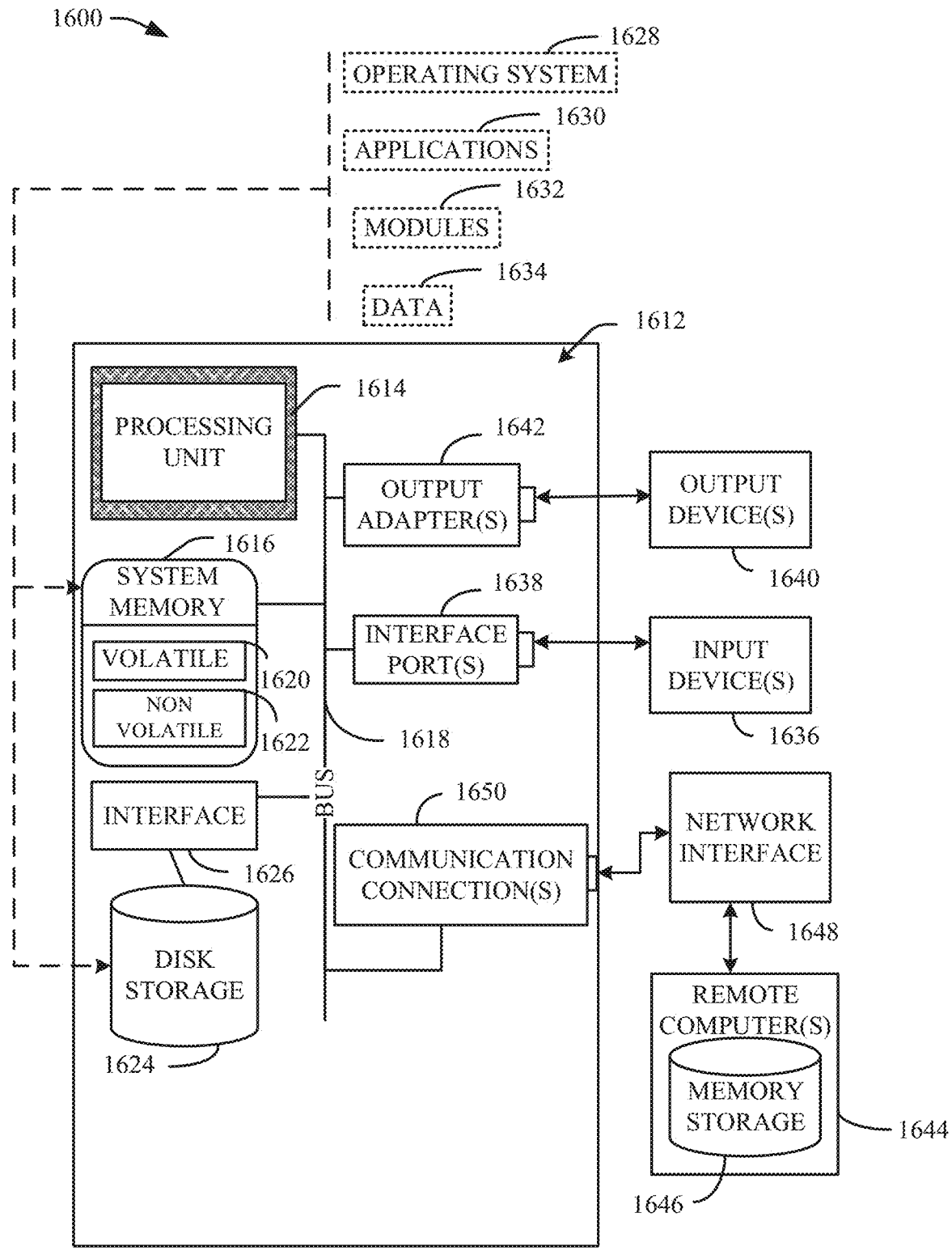
FIG. 16 illustrates a block diagram of an example, non-limiting operating environment in which one or more embodiments described herein can be facilitated.

In order to provide a context for the various aspects of the disclosed subject matter, FIG. 16 as well as the following discussion are intended to provide a general description of a suitable environment in which the various aspects of the disclosed subject matter can be implemented. FIG. 16 illustrates a block diagram of an example, non-limiting operating environment in which one or more embodiments described herein can be facilitated. Repetitive description of like elements employed in other embodiments described herein is omitted for sake of brevity.

With reference to FIG. 16, a suitable operating environment 1600 for implementing various aspects of this disclosure can also include a computer 1612. The computer 1612 can also include a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614. The system bus 1618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1616 can also include volatile memory 1620 and nonvolatile memory 1622. The basic input/output system (BIOS), containing the basic routines to transfer information between elements within the computer 1612, such as during start-up, is stored in nonvolatile memory 1622. Computer 1612 can also include removable/non-removable, volatile/non-volatile computer storage media. FIG. 16 illustrates, for example, a disk storage 1624. Disk storage 1624 can also include, but is not limited to, devices like a magnetic disk drive, floppy disk drive, tape drive, Jaz drive, Zip drive, LS-100 drive, flash memory card, or memory stick. The disk storage 1624 also can include storage media separately or in combination with other storage media. To facilitate connection of the disk storage 1624 to the system bus 1618, a removable or non-removable interface is typically used, such as interface 1626. FIG. 16 also depicts software that acts as an intermediary between users and the basic computer resources described in the suitable operating environment 1600. Such software can also include, for example, an operating system 1628. Operating system 1628, which can be stored on disk storage 1624, acts to control and allocate resources of the computer 1612.

System applications 1630 take advantage of the management of resources by operating system 1628 through program modules 1632 and program data 1634, e.g., stored either in system memory 1616 or on disk storage 1624. It is to be appreciated that this disclosure can be implemented with various operating systems or combinations of operating systems. A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port can be used to provide input to computer 1612, and to output information from computer 1612 to an output device 1640. Output adapter 1642 is provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a computer, a server, a router, a network PC, a workstation, a microprocessor based appliance, a peer device or other common network node and the like, and typically can also include many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1650 refers to the hardware/software employed to connect the network interface 1648 to the system bus 1618. While communication connection 1650 is shown for illustrative clarity inside computer 1612, it can also be external to computer 1612. The hardware/software for connection to the network interface 1648 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a memory that stores computer executable components;
a processor that executes computer executable components stored in the memory, wherein the computer executable components comprise:
a hybrid model component that:
generates a detailed model for a first portion of a device under test that receives a coolant fluid based on a three-dimensional model of a first portion of the device under test;
generates a reduced-order model for a second portion of the device under test based on data generated from the detailed model, wherein the detailed model employs a fluid domain portion modeling in a higher number of dimensions of the three dimensions of the three-dimensional model than another fluid portion domain modeling employed by the reduced-order model, wherein the first portion and the second portion are different portions of the device under test;
generates a hybrid model for two-phase flow in the first portion of the device under test and the second portion of the device under test based on the detailed model and the reduced-order model, and
employs the hybrid model to generate a design that improves the operational quantity of the cooling system associated with the device under test.

2. The system of claim 1, wherein the computer executable components further comprise:
a display component that generates, via a user interface, a display of thermohydraulic information associated with the hybrid model.

3. The system of claim 1, wherein the computer executable components further comprise:
a device model component also determines power dissipation properties for the device under test.

4. The system of claim 1, wherein the computer executable components further comprise:
a system component that determines specification data for the coolant fluid received by the device under test.

5. The system of claim 4, wherein the system component further determines a first pressure drop limit and a second pressure drop limit for the device under test.

6. The system of claim 4, wherein the system component further determines a vapor quality threshold value for vapor generated by the device under test in response to receipt of the coolant fluid.

7. The system of claim 1, wherein the hybrid model component further determines fluid pressure properties for the second simulation domain associated with the device under test.

8. A computer-implemented method, comprising:
generating, by a system operatively coupled to a processor, a detailed model for a first portion of a device under test that receives a coolant fluid based on a three-dimensional model of a first portion of the device under test;
generating, by the system, a reduced-order model for a second portion of the device under test based on data generated from the detailed model, wherein the detailed model employs a fluid domain portion modeling in a higher number of dimensions of the three dimensions of the three-dimensional model than another fluid portion domain modeling employed by the reduced-order model, wherein the first portion and the second portion are different portions of the device under test;
generating, by the system, a hybrid model for two-phase flow in the first portion of the device under test and the second portion of the device under test based on the detailed model and the reduced-order model; and
employing, by the system, the hybrid model to generate a design that improves an operational quantity of the device under test.

9. The computer-implemented method of claim 8, wherein the generating the reduced-order model comprises is based on liquid temperature data indicative of a temperature of the coolant fluid associated with the first portion of the device under test.

10. The computer-implemented method of claim 8, wherein the generating the reduced-order model comprises is based on a heat flux profile indicative of a rate of heat energy transfer through the first portion of the device under test.

11. The computer-implemented method of claim 8, wherein the generating the reduced-order model comprises generating heat transfer data indicative of an exchange of thermal energy throughout second portion of the device under test.

12. The computer-implemented method of claim 8, wherein the generating the reduced-order model comprises generating fluid temperature data indicative of a temperature of the coolant fluid throughout the second portion of the device under test.

13. The computer-implemented method of claim 8, further comprising:
generating, by the system, via a user interface, a display of a rendering of a graphical model of the device under test based on the hybrid model.

14. The computer-implemented method of claim 8, further comprising:
determining, by the system, power dissipation properties for the device under test.

15. A computer program product for simulating two-phase flow in a device under test, the computer program product comprising a computer readable storage medium having program instructions embodied therewith, the program instructions executable by a processor to cause the processor to:
generate a detailed model for a first portion of the device under test that receives a coolant fluid based on a three-dimensional model of a first portion of the device under test;
generate a reduced-order model for a second portion of the device under test based on data generated from the detailed model, wherein the detailed model employs a fluid domain portion modeling in a higher number of dimensions of the three dimensions of the three-dimensional model than another fluid portion domain modeling employed by the reduced-order model, wherein the first portion and the second portion are different portions of the device under test;
generate a hybrid model for two-phase flow in the first portion of the device under test and the second portion of the device under test based on the detailed model and the reduced-order model; and
employ the hybrid model to generate a design that improves an operational quantity of the device under test.

16. The computer program product of claim 15, wherein the program instructions are further executable by the processor to cause the processor to:
generate a display of thermohydraulic information associated with the hybrid model.

17. The computer program product of claim 15, wherein the program instructions are further executable by the processor to cause the processor to:
determine power dissipation properties for the device under test.

18. The computer program product of claim 15, wherein the program instructions are further executable by the processor to cause the processor to:
determine a first pressure drop limit and a second pressure drop limit for the device under test.

19. The computer program product of claim 15, wherein the program instructions are further executable by the processor to cause the processor to:
determine a vapor quality threshold value for vapor generated by the device under test in response to receipt of the coolant fluid.

20. The computer program product of claim 15, wherein the program instructions are further executable by the processor to cause the processor to:
determines fluid pressure properties for the second portion of the device under test.

* * * * *